US011262591B2

(12) United States Patent
Bezel et al.

(10) Patent No.: US 11,262,591 B2
(45) Date of Patent: Mar. 1, 2022

(54) SYSTEM AND METHOD FOR PUMPING LASER SUSTAINED PLASMA WITH AN ILLUMINATION SOURCE HAVING MODIFIED PUPIL POWER DISTRIBUTION

(71) Applicant: KLA-Tencor Corporation, Milpitas, CA (US)

(72) Inventors: Ilya Bezel, Mountain View, CA (US); Matthew Derstine, Los Gatos, CA (US); Andrey Stepanov, Moscow (RU); Nikolay Sherbak, Moscow (RU)

(73) Assignee: KLA Corporation, Milpitas, CA (US)

(*) Notice: Subject to any disclaimer, the term of this patent is extended or adjusted under 35 U.S.C. 154(b) by 0 days.

(21) Appl. No.: 16/186,320

(22) Filed: Nov. 9, 2018

(65) Prior Publication Data

US 2020/0150445 A1 May 14, 2020

(51) Int. Cl.

| | |
|---|---|
| ***G02B 27/09*** | (2006.01) |
| ***H05H 1/24*** | (2006.01) |
| ***H05H 1/02*** | (2006.01) |
| ***G02B 5/00*** | (2006.01) |
| ***H05G 2/00*** | (2006.01) |
| ***H01S 3/00*** | (2006.01) |
| *H01S 3/16* | (2006.01) |

(52) U.S. Cl.

CPC ......... *G02B 27/0927* (2013.01); *G02B 5/001* (2013.01); *G02B 27/0944* (2013.01); *G02B 27/0955* (2013.01); *H01S 3/0071* (2013.01); *H05G 2/008* (2013.01); *H05H 1/02* (2013.01); *H05H 1/24* (2013.01); *H01S 3/1611* (2013.01); *H01S 3/1643* (2013.01)

(58) Field of Classification Search

CPC ........ H01J 65/04; H01J 61/025; H05G 2/008; H05G 1/02; G02B 27/0927; G02B 5/001; G02B 27/0955; G02B 27/0944; H05H 1/24; H05H 1/46; H05H 1/02; H05H 1/0006; H05H 1/0037; H05H 1/0043; H01S 3/005; H01S 3/0071

See application file for complete search history.

(56) References Cited

U.S. PATENT DOCUMENTS

| | | | | |
|---|---|---|---|---|
| 5,608,526 | A | 3/1997 | Piwonka-Corle et al. | |
| 5,999,310 | A | 12/1999 | Shafer et al. | |
| 6,297,880 | B1 | 10/2001 | Rosencwaig et al. | |
| 6,597,430 | B1 * | 7/2003 | Nishi ................. | G03F 7/70583 355/53 |

(Continued)

OTHER PUBLICATIONS

A. Schreiber et al., Illumination Resistance of Quartz Glass for VUV Discharge Lamps, J. Phys. D: Appl. Phys. 38 (2005), 3242-3250.

*Primary Examiner* — Wyatt A Stoffa

(74) *Attorney, Agent, or Firm* — Suiter Swantz pc llo

(57) ABSTRACT

A system for generating pump illumination for laser sustained plasma (LSP) is disclosed. In embodiments, the system includes an illumination source and a beam shaper. The illumination source can be configured to output illumination having a first pupil power distribution. In embodiments, the beam shaper is configured to receive the illumination having the first pupil power distribution from the illumination source and is further configured to output pump illumination having a second pupil power distribution that is different from the first pupil power distribution.

27 Claims, 20 Drawing Sheets

(56) References Cited

U.S. PATENT DOCUMENTS

| | | | |
|---|---|---|---|
| 7,435,982 | B2 | 10/2008 | Smith |
| 7,525,649 | B1 | 4/2009 | Leong et al. |
| 7,786,455 | B2 | 8/2010 | Smith |
| 9,099,292 | B1 | 8/2015 | Bezel et al. |
| 9,185,788 | B2 | 11/2015 | Bezel et al. |
| 9,279,774 | B2 | 3/2016 | Romanovsky et al. |
| 9,318,311 | B2 | 4/2016 | Chimmalgi et al. |
| 9,615,439 | B2 | 4/2017 | Bezel et al. |
| 9,775,226 | B1 | 9/2017 | Bezel et al. |
| 9,927,094 | B2 | 3/2018 | Bezel et al. |
| 10,234,402 | B2 * | 3/2019 | Zhao .................... G01N 21/643 |
| 10,362,665 | B2 * | 7/2019 | Smorenburg ....... G03F 7/70625 |
| 2006/0219673 | A1 * | 10/2006 | Varnham ............ B23K 26/0734 219/121.6 |
| 2007/0002465 | A1 | 1/2007 | Chuang et al. |
| 2009/0180176 | A1 | 7/2009 | Armstrong et al. |
| 2013/0105712 | A1 * | 5/2013 | Yanagida ............... H05G 2/003 250/504 R |
| 2013/0114085 | A1 | 5/2013 | Wang et al. |
| 2013/0256568 | A1 * | 10/2013 | Endo ...................... H05G 2/003 250/504 R |
| 2015/0042979 | A1 * | 2/2015 | Chimmalgi ........ G01N 21/8806 356/51 |
| 2016/0381776 | A1 | 12/2016 | Derstine et al. |
| 2017/0025287 | A1 * | 1/2017 | Anikitchev ........ G02B 27/0988 |
| 2017/0241914 | A1 * | 8/2017 | Van Heumen ....... G01N 21/956 |
| 2017/0259375 | A1 * | 9/2017 | Kumkar ............. G02B 27/0927 |
| 2018/0107006 | A1 * | 4/2018 | Hertwig ................... G02B 5/10 |
| 2018/0114687 | A1 * | 4/2018 | Chuang ................... H01J 61/16 |
| 2018/0368243 | A1 * | 12/2018 | Smorenburg ........ G01N 21/956 |
| 2019/0141826 | A1 * | 5/2019 | Hori ...................... H01S 3/2308 |
| 2019/0324281 | A1 * | 10/2019 | Diebold ............. G01N 15/0227 |
| 2019/0346776 | A1 * | 11/2019 | O Dwyer ............. G01N 21/956 |

* cited by examiner

SYSTEM AND METHOD FOR PUMPING LASER SUSTAINED PLASMA WITH AN ILLUMINATION SOURCE HAVING MODIFIED PUPIL POWER DISTRIBUTION

TECHNICAL FIELD

The present disclosure relates generally to illumination sources and more particularly to laser sustained plasma (LSP) sources.

BACKGROUND

Laser sustained plasmas (LSPs) are used as broad-band light sources in a variety of applications including wafer inspection and metrology. Relatively simple focusing optics are typically used that produce focused light with a bell-shaped, near-Gaussian power distribution in the pupil. Such power distribution is a consequence of bell-shaped, near-Gaussian power distribution in the pupil of most near-infrared (NIR) commercial lasers used as LSP pump sources. For some broad band plasma (BBP) tools, the pump scheme is somewhat different with the pump beam distributed in an annual manner. This may result in the pupil power distribution having bell-like cross-section with a center obscuration that results in a sharp edge at low angles.

The existing pump laser designs provide acceptable baseline performance for LSP currently used as light sources. The common feature for all of them is that relatively simple collimating/focusing optics are used that provide bell-shape, near Gaussian pupil distributions of the pump laser beam. This is especially true for low-power (e.g., less than a few hundred Watts) systems. However, the bell-shaped, Gaussian/near-Gaussian distribution of pump lasers used to date does not provide optimal pump laser distribution for plasma performance (radiance). Consequently, there is a need for systems and methods that provide improved pupil distribution of the pump laser radiant power.

SUMMARY

A system for generating pump illumination for laser sustained plasma (LSP) is disclosed, in accordance with one or more illustrative embodiments of the present disclosure. In one illustrative embodiment, the system includes an illumination source (sometimes referred to as the "pump source") and a beam shaper. In embodiments, the beam shaper is configured to receive illumination having a first pupil power distribution from the illumination source and is further configured to output pump illumination having a second pupil power distribution that is different from the first pupil power distribution. For example, the second pupil power distribution may comprise a modified (e.g., flattened, inverted, and/or truncated) version of the first pupil power distribution.

A system for generating broadband illumination by pumping LSP with illumination having a modified pupil power distribution is also disclosed, in accordance with one or more illustrative embodiments of the present disclosure. In one illustrative embodiment, the system includes a plasma forming material, an illumination source (i.e., the pump source), a beam shaper, and one or more optical elements. In embodiments, the beam shaper is configured to receive illumination having a first pupil power distribution from the illumination source and is further configured to output pump illumination having a second pupil power distribution that is different from the first pupil power distribution. For example, the second pupil power distribution may comprise a modified (e.g., flattened, inverted, and/or truncated) version of the first pupil power distribution. In embodiments, the one or more optical elements can be configured to direct the pump illumination to the plasma forming material, whereby the pump illumination causes the plasma forming material to form a plasma that emits broadband illumination.

A method of generating broadband illumination by pumping LSP with illumination having a modified pupil power distribution is also disclosed, in accordance with one or more illustrative implementations of the present disclosure. In one illustrative implementation, the method includes: generating illumination having a first pupil power distribution; reshaping the illumination having the first pupil power distribution into to pump illumination having a second pupil power distribution that is different from the first pupil power distribution; and directing the pump illumination to a plasma forming material, whereby the pump illumination causes the plasma forming material to form a plasma that emits broadband illumination.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Figure 1A:
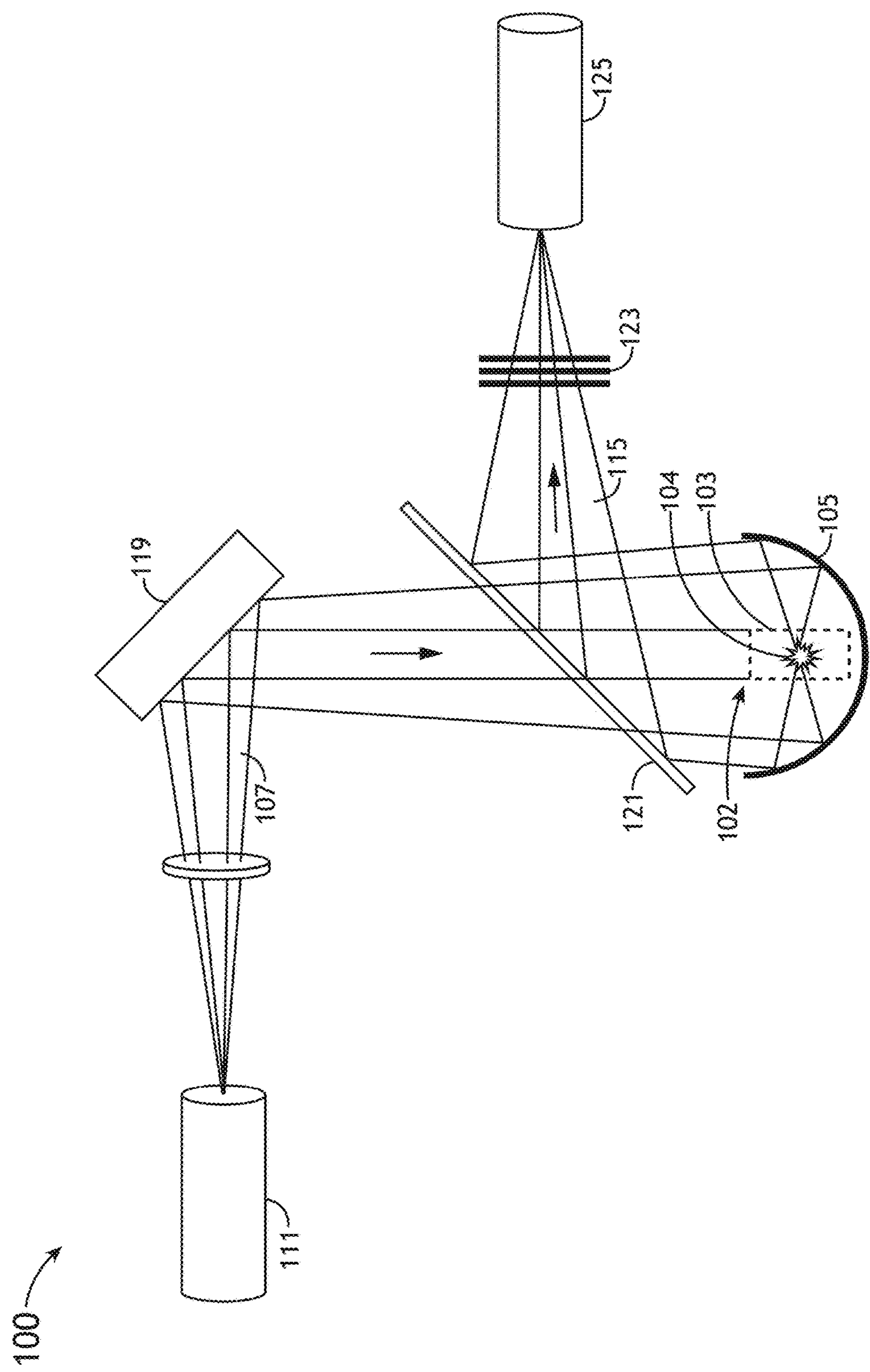
FIG. 1A is a schematic illustration of a laser sustained plasma (LSP) illumination system that can employ a pump source that has a modified pupil power distribution, in accordance with one or more embodiments of the present disclosure.
Figure 1B:
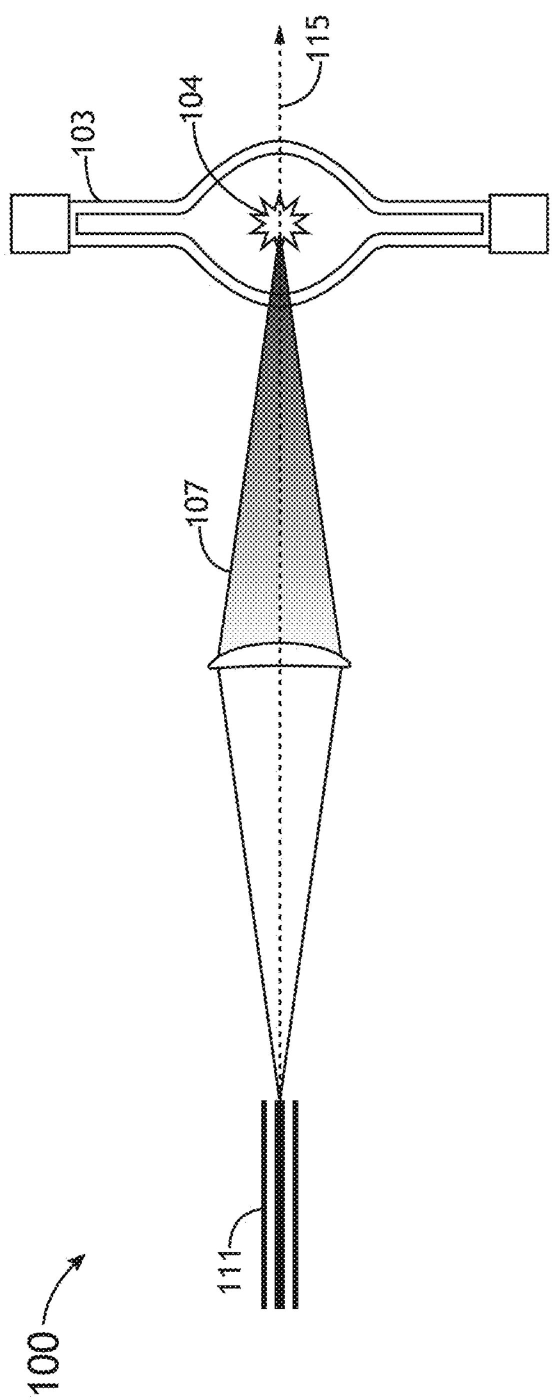
FIG. 1B is a schematic illustration of a laser sustained plasma (LSP) illumination system that can employ a pump source that has a modified pupil power distribution, in accordance with one or more embodiments of the present disclosure.
Figure 1C:
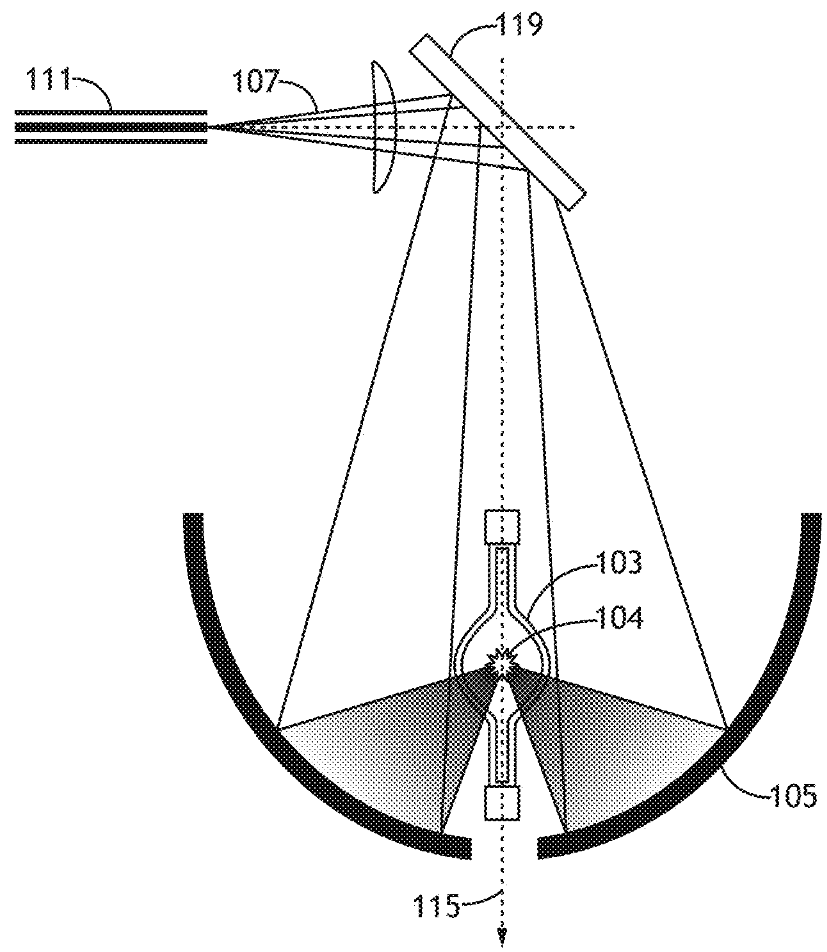
FIG. 1C is a schematic illustration of a laser sustained plasma (LSP) illumination system that can employ a pump source that has a modified pupil power distribution, in accordance with one or more embodiments of the present disclosure.
Figure 2A:
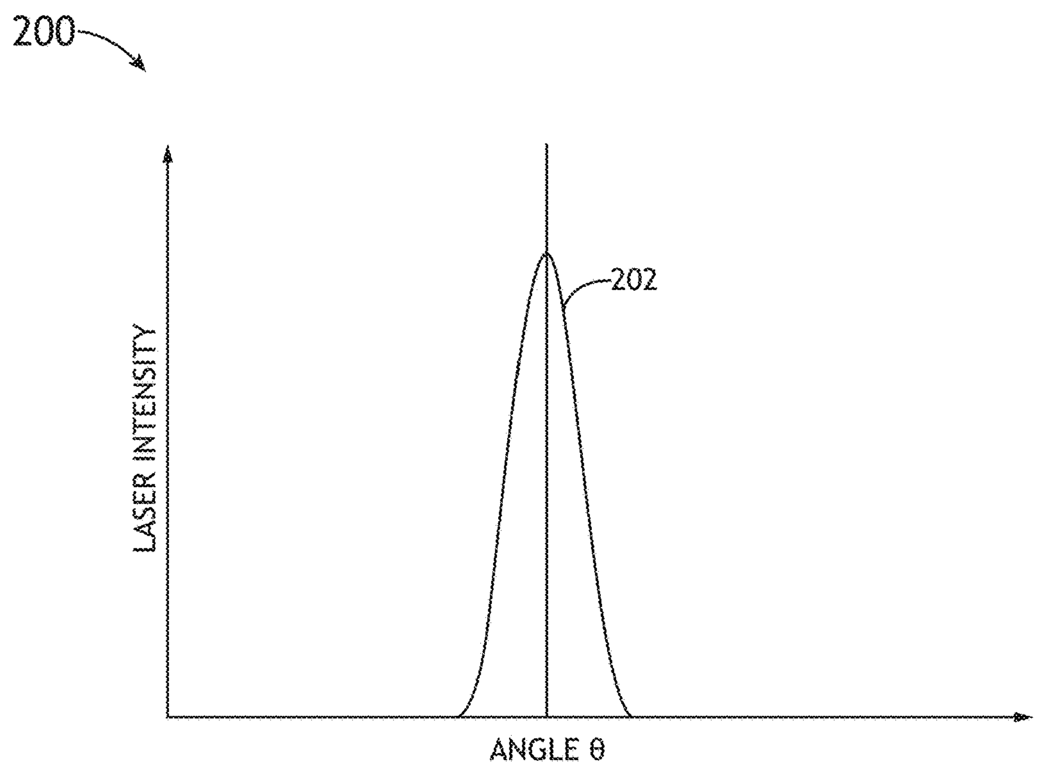
FIG. 2A is a graphical plot of pupil power distribution for a conventional pump source of a LSP illumination system, such as the system illustrated in FIG. 1B, in accordance with one or more embodiments of the present disclosure.
Figure 2B:
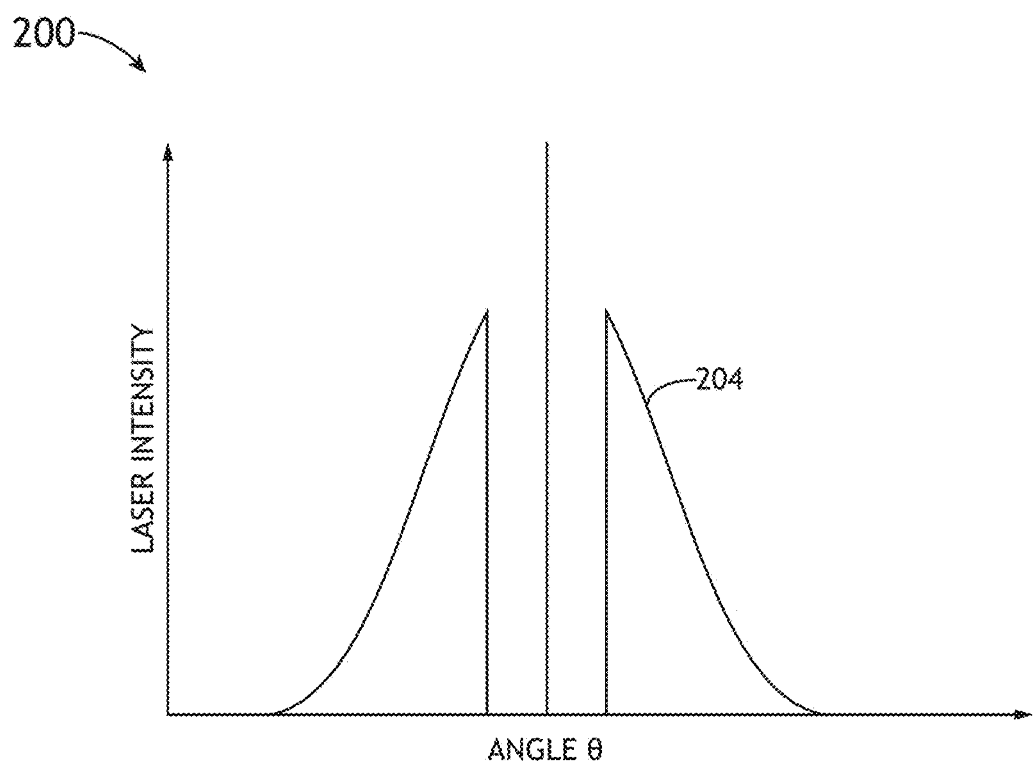
FIG. 2B is a graphical plot of pupil power distribution for a conventional pump source of a LSP illumination system, such as the system illustrated in FIG. 1C, in accordance with one or more embodiments of the present disclosure.

In LSP illumination systems, such as those illustrated in FIGS. 1A and 1B, relatively simple focusing optics are typically used that produce focused light with a bell-shaped, near-Gaussian power distribution in the pupil (e.g., as shown in FIG. 2A). Such power distribution is a consequence of bell-shaped, near-Gaussian power distribution in the pupil of most near-infrared (NIR) commercial lasers used as LSP pump sources. For some broad band plasma (BBP) tools, such as the LSP illumination system illustrated in FIG. 1C, the pump scheme is somewhat different with the pump beam distributed in an annual manner (e.g., as shown in FIG. 2B). This may result in the pupil power distribution having bell-like cross-section with a center obscuration that results in a sharp edge at low angles.

Figure 3:
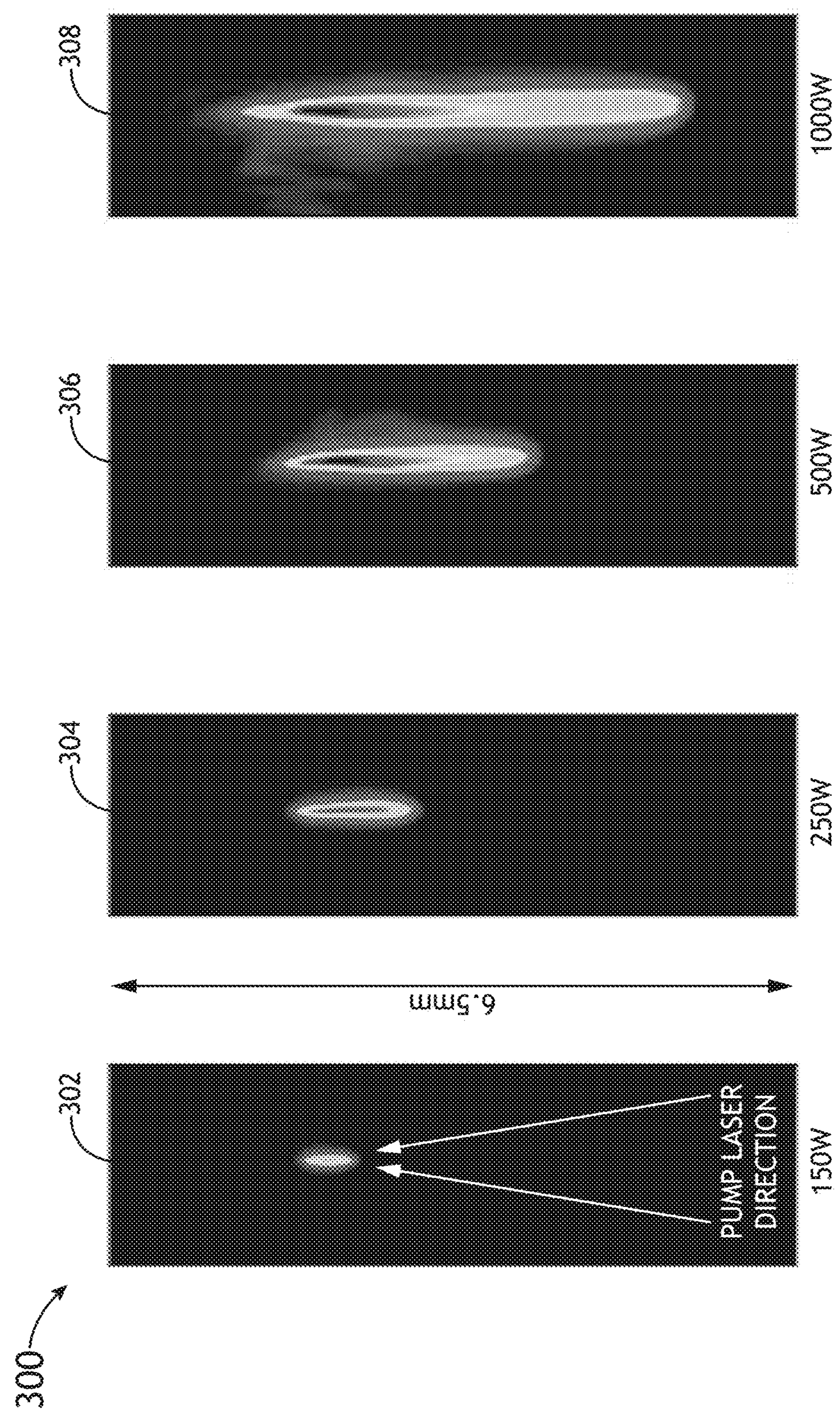
FIG. 3 shows example views of LSP pumped at different laser powers with a conventional pump source with low numerical aperture (NA), such as in the system illustrated in FIG. 1B, in accordance with one or more embodiments of the present disclosure.
Figure 4A:
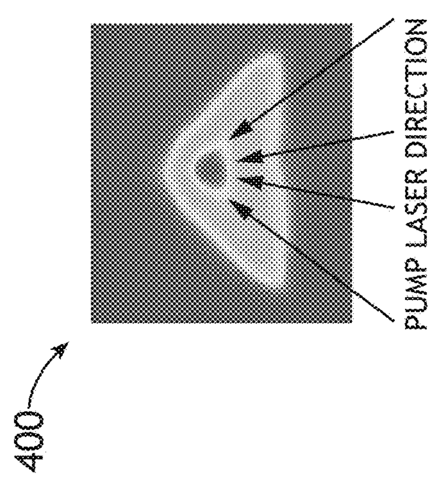
FIG. 4A shows an example view of LSP pumped with a conventional pump source with high NA, such as in the system illustrated in FIG. 1C, in accordance with one or more embodiments of the present disclosure.
Figure 4B:
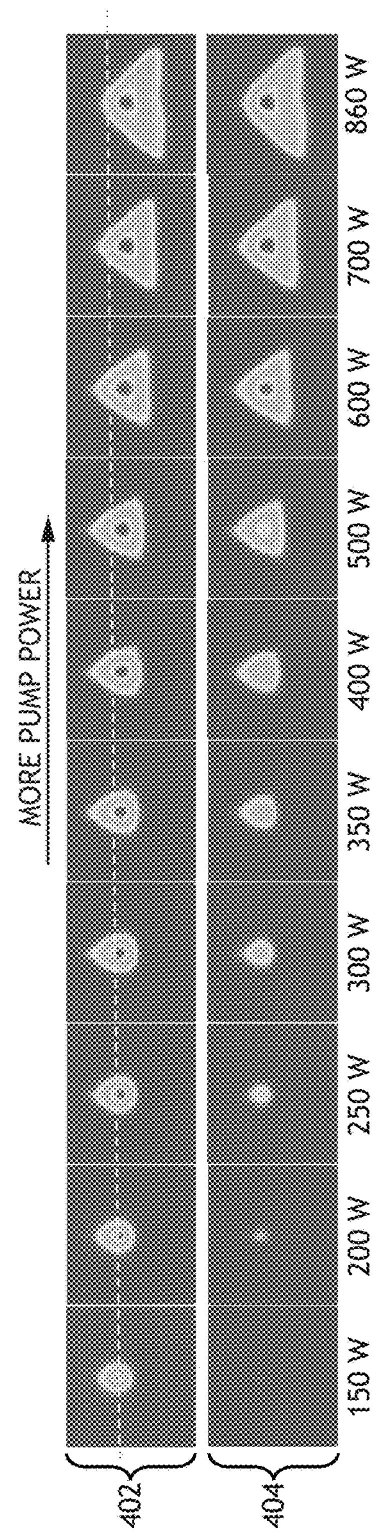
FIG. 4B shows example views of LSP pumped at different laser powers with a conventional pump source with high NA, such as in the system illustrated in FIG. 1C, in accordance with one or more embodiments of the present disclosure.

The main limitation of LSP light source performance is plasma growth at higher operation power. For example, FIG. 3 shows a set 300 of example views (e.g., views 302, 304, 306, and 308) that depict a LSP increasing in size and growing toward the pump laser as the laser power increases. FIGS. 4A and 4B also illustrate example views 400 that depict a LSP increasing in size and growing toward the pump laser as the laser power increases, with a first set 402 of views normalized to maximum amplitude and a second set 404 at same exposure.

The laser may be focused with relatively low numerical aperture (NA) of approximately 0.3 with near-Gaussian power distribution in the NA space. At low laser powers, the plasma sustainability conditions may be satisfied near the laser focus, where the pump laser intensity is sufficiently high. Away from the focus, the laser may propagate with little absorption in the cold gas, and delivery efficiency of the laser to the center of the plasma is high. In order to obtain brighter, higher temperature plasma in the focus, pump laser intensity at the focus must increase. This can be achieved in low-power regime by increasing pump laser power. However, in the high-power regime, the plasma starts to grow (e.g., as illustrated in FIGS. 3 and 4B), and plasma growth in the direction of the pump laser results in pump laser being absorbed further and further away from the laser focus since the pump has to propagate through warm absorbing plasma. The plasma size increases while the maximum radiance stays almost constant and eventually starts to decrease. This limits the maximum plasma radiance.

There are a few ways of improving plasma radiance that have been implemented. One way is increasing pump laser convergence angle (i.e., focusing NA). In some of the more extreme examples of this solution, such as in FIGS. 1A and 1C, the pump laser convergence solid angle is almost 3π steradian. However, for many practical implementations, maximum focusing NA is limited to smaller solid angles.

"High-power" operation regime can be defined as the regime of operation where the apparent plasma shape loses spherical shape and starts reflecting the shape of the pump laser beam. Transition from low-power to high-power regimes occur at different pump levels depending on the pump focusing NA. Generally, the higher the NA of the pump, the higher the transition point is. For example, for a low-NA pump, high-power regime may be achieved at as low as 150 W (e.g., as shown in FIG. 3), whereas for a high-NA pump, the transition may occur at approximately 400 W (e.g., as shown in FIG. 4B) or higher.

The bell-shaped, Gaussian/near-Gaussian distribution of pump lasers used to date does not provide optimal pump laser distribution for plasma performance (radiance). Accordingly, systems and methods with improved distribution of the pump laser radiant power within the available pump solid angle are disclosed herein.

Referring generally to FIGS. 1A through 16, systems and methods are disclosed for generating broadband illumination by pumping laser sustained plasma (LSP) with an illumination source (sometimes referred to as the "pump source") that has a modified pupil power distribution, in accordance with illustrative embodiments of the present disclosure. In embodiments of this disclosure, the LSP pump illumination is generated by using one or more optical elements to reshape the output illumination of the pump source (e.g., a pump laser) so that the pupil power distribution of the pump illumination is a modified (e.g., flattened, inverted, and/or truncated) version of the original output illumination of the pump source. In embodiments, the illumination from the pump source is redistributed within the pump NA to improve plasma radiance in the center. In order to attain improved performance, the pump radiant power distribution inside the NA may be flattened, inverted (e.g., higher at the edges of the solid angle than it is at the center), or otherwise modified (e.g., truncated). Such distribution can be obtained from a typical distribution from a fiber-coupled laser, using dedicated beam shaping optical modules, and/or generated by other methods (e.g., by truncating the wings of the laser pupil distribution by more than about 20% of the peak value—the standard for optics design is <5%). These changes are different from normal beam manipulation by using focusing/defocusing lenses that change the focusing angle but do not change the shape of laser beam distribution. In some embodiments, a combination of these beam shaping techniques and/or others may be employed to modify the pupil power distribution for the LSP pump source.

Figure 5A:
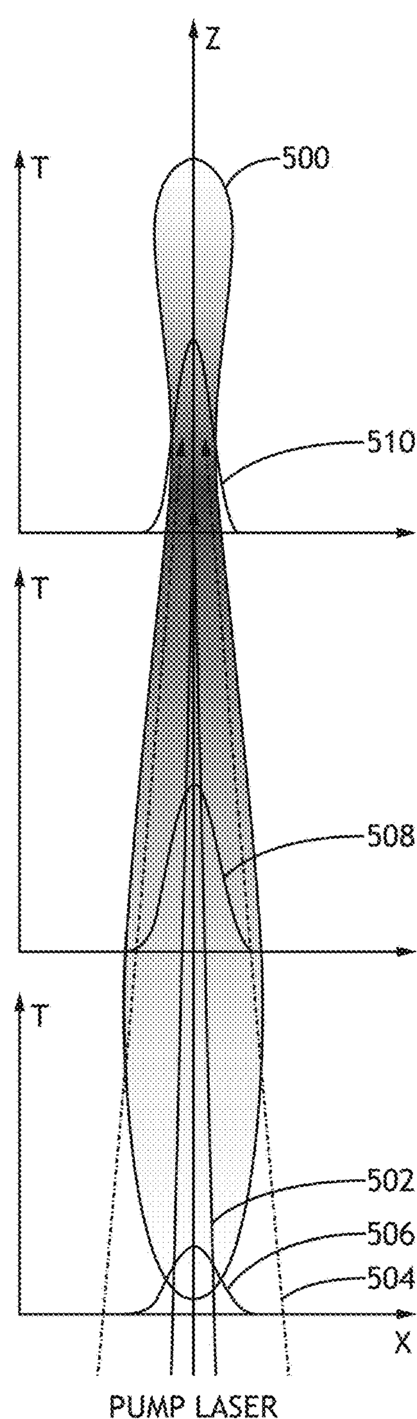
FIG. 5A shows a schematic illustration and graphical plots of temperature distributions at different plasma regions for a LSP illumination system with a conventional pump source, in accordance with one or more embodiments of the present disclosure.
Figure 5B:
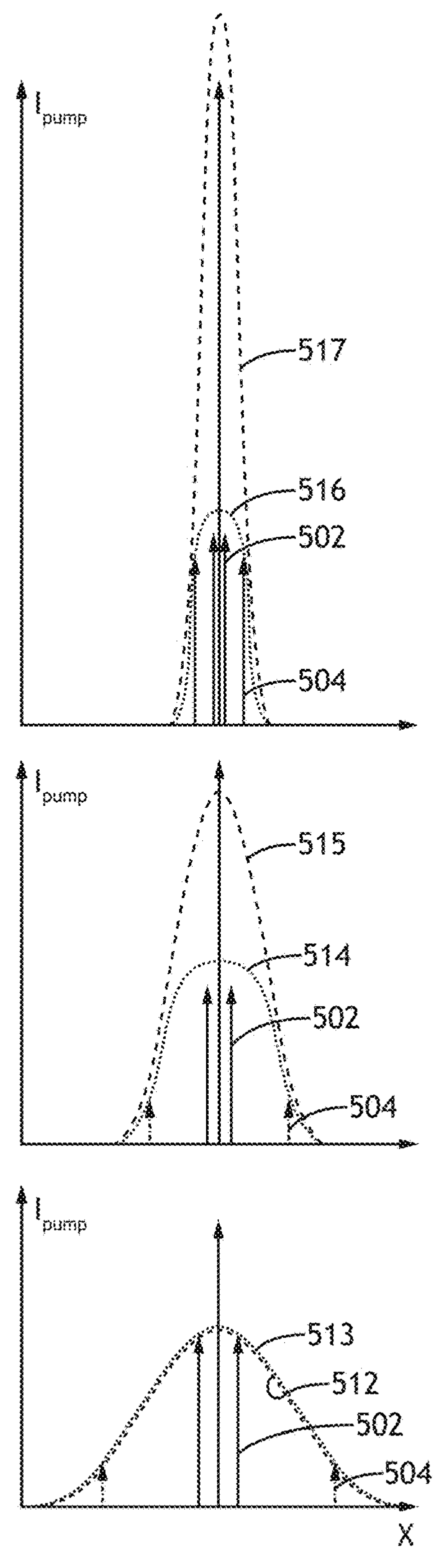
FIG. 5B shows graphical plots of pump illumination intensity distributions at different plasma regions for a LSP illumination system with a conventional pump source, in accordance with one or more embodiments of the present disclosure.
Figure 6A:
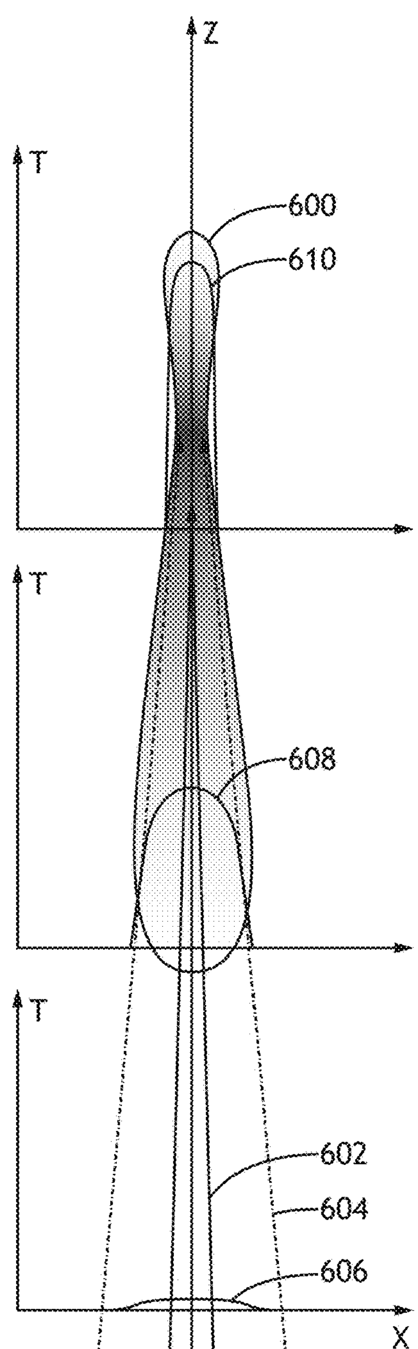
FIG. 6A shows a schematic illustration and graphical plots of temperature distributions at different plasma regions for a LSP illumination system with a pump source that has a modified (e.g., flattened) pupil power distribution, in accordance with one or more embodiments of the present disclosure.
Figure 6B:
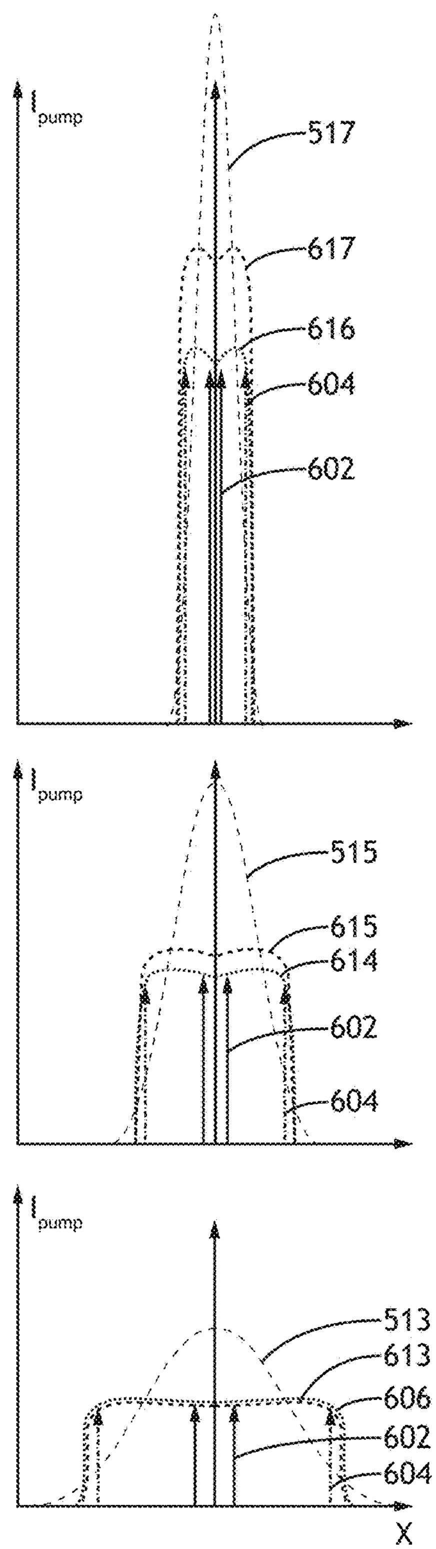
FIG. 6B shows graphical plots of pump illumination intensity distributions at different plasma regions for a LSP illumination system with a pump source that has a modified (e.g., flattened) pupil power distribution, in accordance with one or more embodiments of the present disclosure.

FIGS. 5A through 6B help illustrate some advantages the disclosed systems and methods (FIGS. 6A and 6B) provide over previously used pump source configurations (FIGS. 5A and 5B). First, what determines the plasma size and peak radiance must be considered. FIGS. 5A and 6A schematically illustrate the visible part of the plasma 500/600 in a relatively low-NA pump arrangement. The pump illumination is focused from below as indicated by arrows 502/602 and 504/604. The plasma bottom boundary is located where the pump illumination intensity reaches the critical value sufficient for plasma sustainability. The graphical plots 506/606, 508/608, and 510/610 in FIGS. 5A and 6A illustrate the temperature distributions at different z locations. The graphical plots in FIGS. 5B and 6B illustrate distributions of pump illumination intensity (e.g., laser power distributions) in the same z locations, where curves 513/613, 515/615, and 517/617 illustrate distributions of pump illumination intensity in the absence of absorption. This intensity grows toward the laser focus proportionally to inverse square of distance to focus. Curves 512/612, 514/614, and 516/616 illustrate distributions of pump illumination intensity accounting for absorption in plasma. These curves are always under curves 513/613, 515/615, and 517/617, and the difference increases as the pump beam propagates through warm plasma regions.

FIGS. 5A and 5B illustrate the laser intensity (power density) and plasma temperature distributions for a traditional pump source, and FIGS. 6A and 6B illustrate the laser intensity (power density) and plasma temperature distributions with modified (e.g., flat top) pump illumination and the same laser power. In the traditional bell-shaped pump scheme (FIGS. 5A and 5B), the central portion of the beam (displayed by arrows 502) is focused having highest intensity. This causes the plasma to be sustained at a long distance from the focus. The pump illumination propagated along these lines is absorbed by the plasma over a large distance. The outer wings of the beam (displayed by arrows 504) would propagate through the edge of the plasma and absorb less because plasma temperature at the periphery is lower and absorption grows rapidly with temperature. In the systems and methods disclosed herein, the pump illumination (e.g., laser) distribution in the pupil is modified such that the pump illumination beam is either flattened (e.g., converted to a flat top distribution or the like), inverted (e.g., has a higher intensity at the edges of the pupil than in the center), and/or truncated. FIGS. 6A and 6B illustrate an example of the pump illumination propagation through the plasma, where the pump illumination has been modified (e.g., flattened) in accordance with one or more of the proposed schemes. The peak pump illumination intensity in the proposed case is smaller than in the traditional bell-shaped distribution. Because of that, plasma sustainability conditions occur at distances closer to the pump source focus and, consequently, the plasma is smaller. Having shorter path to propagate through absorbing plasma, the pump illumination power delivered to the focus is larger and the resulting plasma is hotter and brighter than for traditional pump shapes.

Figure 7:
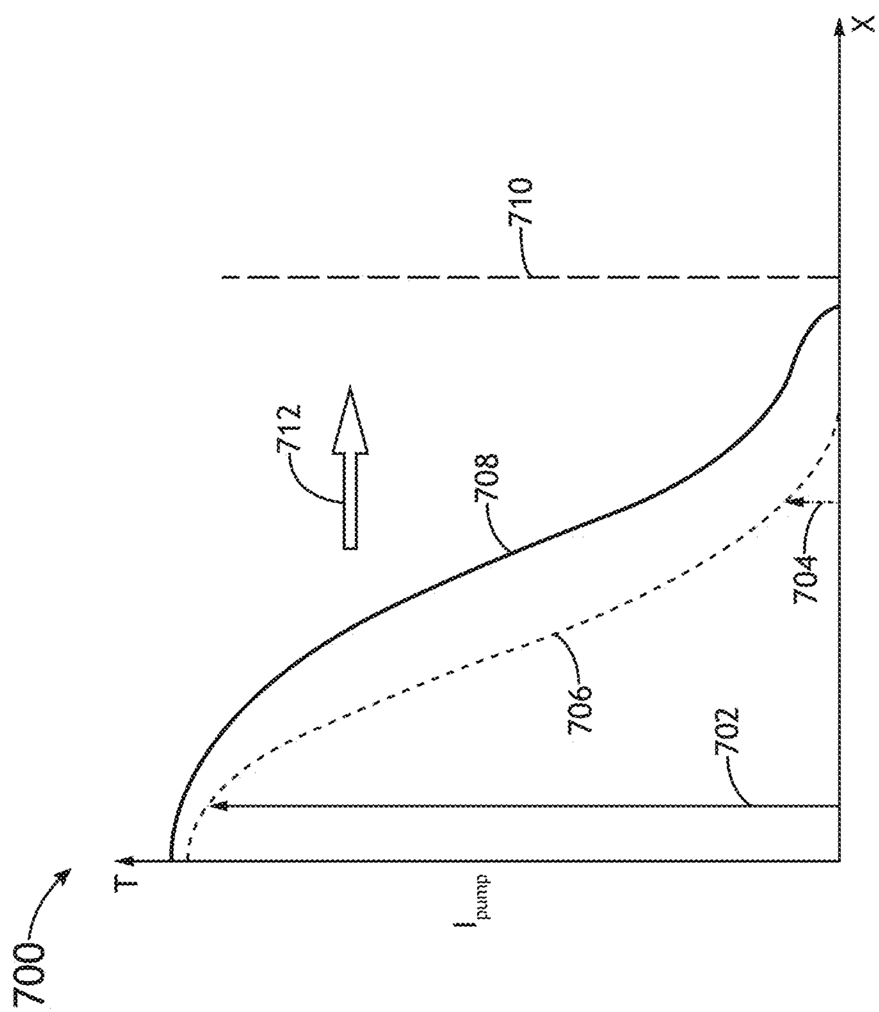
FIG. 7 is a graphical plot of pupil power distribution and plasma temperature distribution for a LSP illumination system with a conventional pump source, in accordance with one or more embodiments of the present disclosure.
Figure 8:
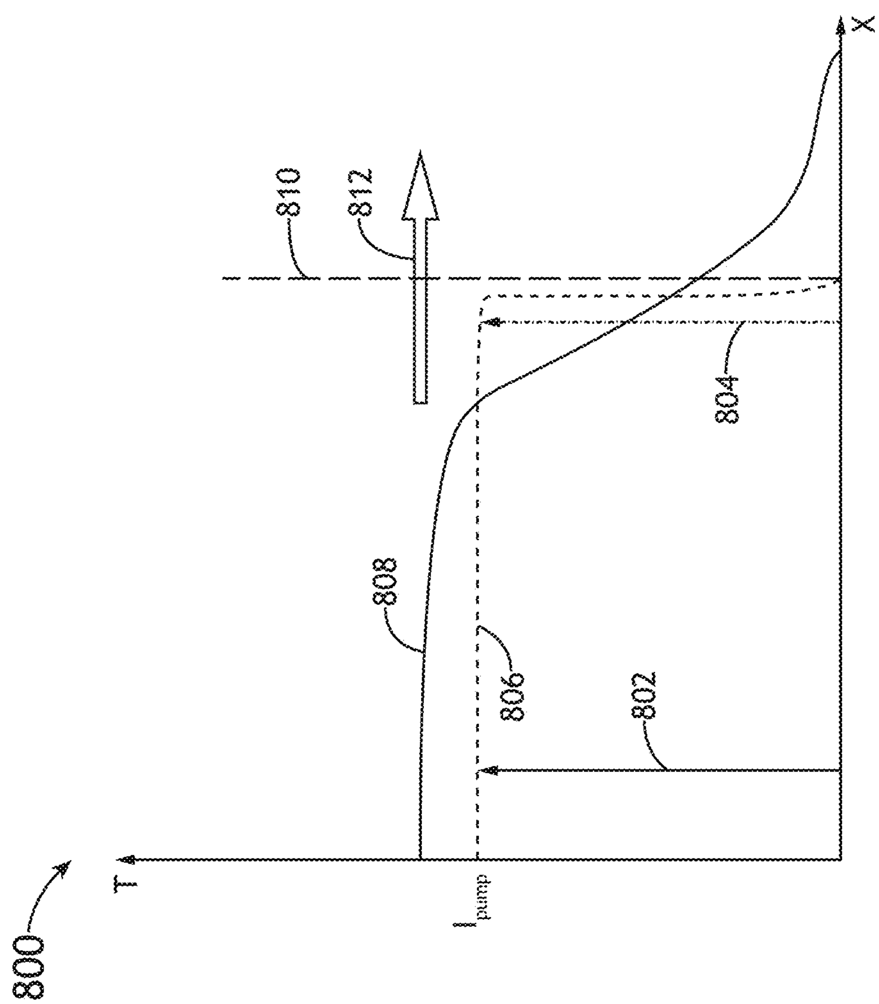
FIG. 8 is a graphical plot of pupil power distribution and plasma temperature distribution for a LSP illumination system with a pump source that has a modified (e.g., flattened) pupil power distribution, in accordance with one or more embodiments of the present disclosure.
Figure 9:
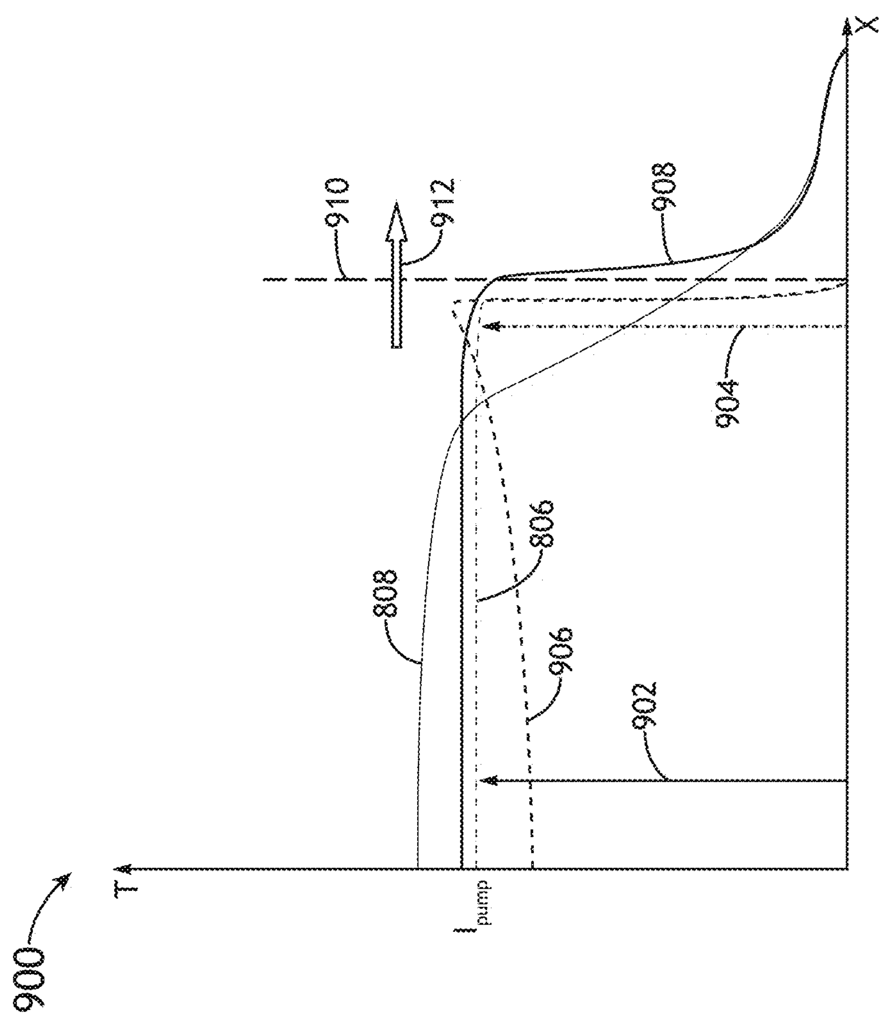
FIG. 9 is a graphical plot of pupil power distribution and plasma temperature distribution for a LSP illumination system with a pump source that has a modified (e.g., inverted) pupil power distribution, in accordance with one or more embodiments of the present disclosure.

Advantages of the pump illumination schemes disclosed herein over the traditional pump sources are further illustrated in FIGS. 7 through 9. FIGS. 7 through 9 include graphical plots 700, 800, and 900, respectively, that demonstrate laser propagation and plasma edge effects for traditional and modified pump illumination schemes. In the graphical plots 700, 800, and 900 illustrated in FIGS. 7 through 9, curves 806, 706, and 906 depict laser intensity distributions in a cross-section through a plasma normal to laser beam propagation at a sufficient separation from the focus (i.e., approximately in the pupil space). FIG. 7 shows a graphical plot 700 for a standard pump pupil; FIG. 8 shows a graphical plot 800 for a proposed flat-top distribution of laser power in the pupil plane; and FIG. 9 shows a graphical plot 900 for a proposed inverted distribution of laser power in the pupil plane. Curves 708, 808, and 908 show corresponding plasma temperature distributions. Lines 710, 810, and 910 indicate the nominal laser beam size (e.g., for a typical optical design, two $1/e^2$ diameters or more).

When the laser field has a strong gradient at the edge of flat-top distribution, the plasma temperature near the edge does not follow the laser intensity variation. Thermal conductivity causes in inner parts of the plasma, absorbing the laser power, to heat gas in the outer regions where the laser intensity is low. Arrows 712, 812, and 912 indicate the direction of heat transfer in the plasma. Since the plasma loses energy through light emission, sustaining plasma outside of the laser field drains power from the edge of the plasma and plasma temperature at the laser edge is lower than it would be in the absence of thermal conductivity. If the laser gradient is high, it causes a large thermal gradient and large amount of heat transferred by conductivity. The result of this is that the temperature of plasma through which the edge of the laser beam propagates is lower than in the center of the beam. Consequently, the absorption loss for the edge of the beam (arrow 704/804/904) is less than for the center of the beam (arrow 702/802/902). The situation is similar in the traditional beam focusing (panel A) but the fraction of power propagated through the high-temperature region of the plasma is higher and thus the power loss due to absorption is larger. In addition, due to concentration of the laser power near the center of the beam, the plasma temperature is higher and thus the absorption is higher too. Thus, the traditional way of focusing the laser results in a larger fraction of the beam being absorbed in the plasma (FIG. 7) and has lower delivery efficiency to the laser focus than in the proposed flat-top pupil power distribution scheme (FIG. 8). In fact, for even better delivery efficiency of the laser power to the focus, the shape of the laser beam in the pupil may be modified to an inverted distribution (i.e., having higher intensity near the edge than near the center), as shown in FIG. 9. Generally, the systems and methods disclosed herein may employ any optics scheme to improve LSP radiance by changing the shape of the pump illumination beam in such a way that it fills the entire available solid angle uniformly and also by making a shaper edge at the boundary.

Figure 10:
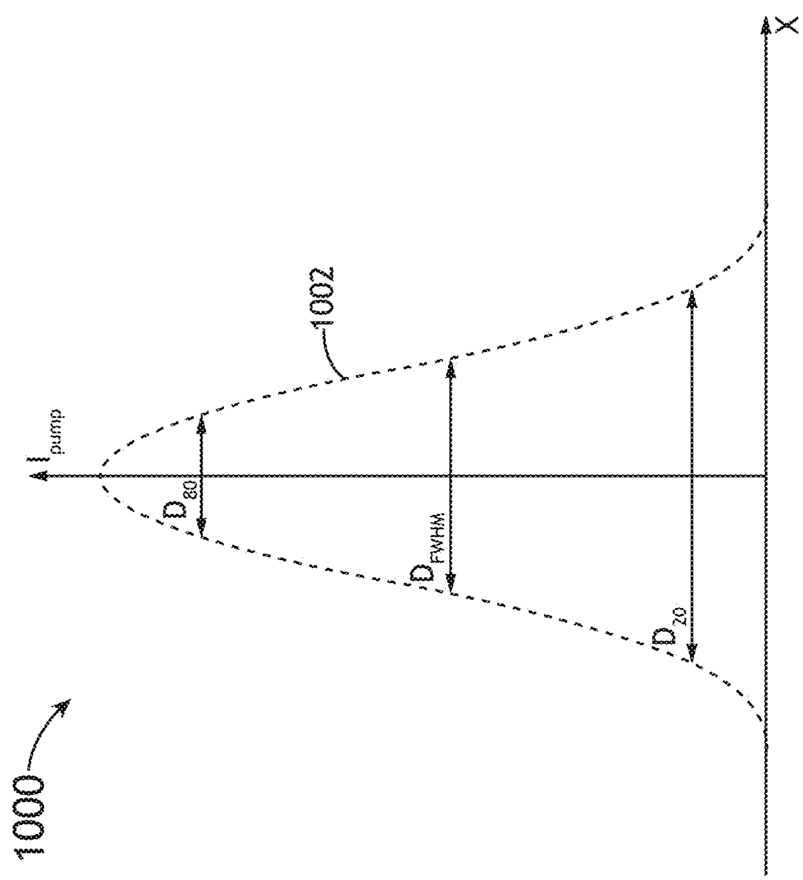
FIG. 10 is a graphical plot of pupil power distribution relative to beam diameter for a conventional pump source, in accordance with one or more embodiments of the present disclosure.
Figure 11:
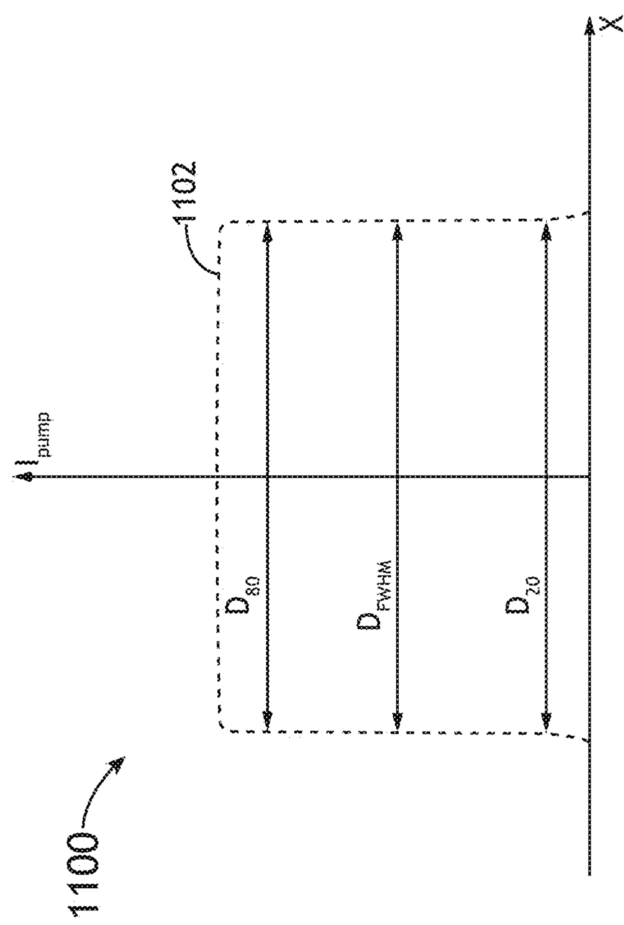
FIG. 11 is a graphical plot of pupil power distribution relative to beam diameter for a pump source that has a modified (e.g., flattened) pupil power distribution, in accordance with one or more embodiments of the present disclosure.

FIGS. 10 and 11 illustrate graphical plots 1000, 1100 with curves 1002, 1102 that can help quantitatively demonstrate the changes to the pump illumination contemplated by the systems and methods disclosed herein. The following metric can be considered. If the diameter at which the laser intensity reaches 20%, 50%, and 80% of the peak value is determined as $D_{20}$, $D_{FWHM}$, and $D_{80}$, respectively, the typical values for a ratio $(D_{20}\text{-}D_{80})/D_{FWHM}$ is about one for a Gaussian beam (FIG. 10). For flat-top beams (FIG. 11) that have steeper edge, this ratio is smaller. For practical purposes, a ratio of about 0.5 or smaller $$\left(\text{i.e., that } \frac{D_{20} - D_{80}}{D_{FWHM}} < 0.5\right)$$

can distinguish between previously LSP pump implementations and the LSP pump implementations disclosed herein. The use of standard focusing/defocusing optics does not significantly alter this ratio. Special optical designs (e.g., with beam shaping optics) are therefore required to change the pupil distribution. Various implementations are described below.

FIGS. 1A through 1D illustrate a LSP illumination system 100 for generating broadband illumination by forming and/or sustaining LSP, in accordance with embodiments of the present disclosure. The generation of plasma is generally described in U.S. Pat. No. 7,786,455, granted on Aug. 31, 2010; and U.S. Pat. No. 7,435,982, granted on Oct. 14, 2008, which are incorporated herein by reference in their entirety. Various plasma cell designs and plasma control mechanisms are described in U.S. Pat. No. 9,318,311, granted on Apr. 19, 2016, which is incorporated herein by reference in the entirety. The generation of plasma is also generally described in U.S. Pat. No. 9,615,439, granted on Apr. 4, 2017, which is incorporated by reference herein in the entirety. Plasma cell and control mechanisms are also described in U.S. Pat. No. 9,775,226, granted on Sep. 26, 2017, which is incorporated by reference herein in the entirety. Plasma cell and control mechanisms are also described in U.S. Pat. No. 9,185,788, granted on Nov. 10, 2015, which is incorporated by reference herein in the entirety. Plasma cell and control mechanisms are also described in U.S. Pat. No. 9,927,094, granted on Mar. 27, 2018, which is incorporated by reference herein in the entirety. In a general sense, the system 100 should be interpreted to extend to any plasma (e.g., LSP) based illumination source known in the art.

Figure 1D:
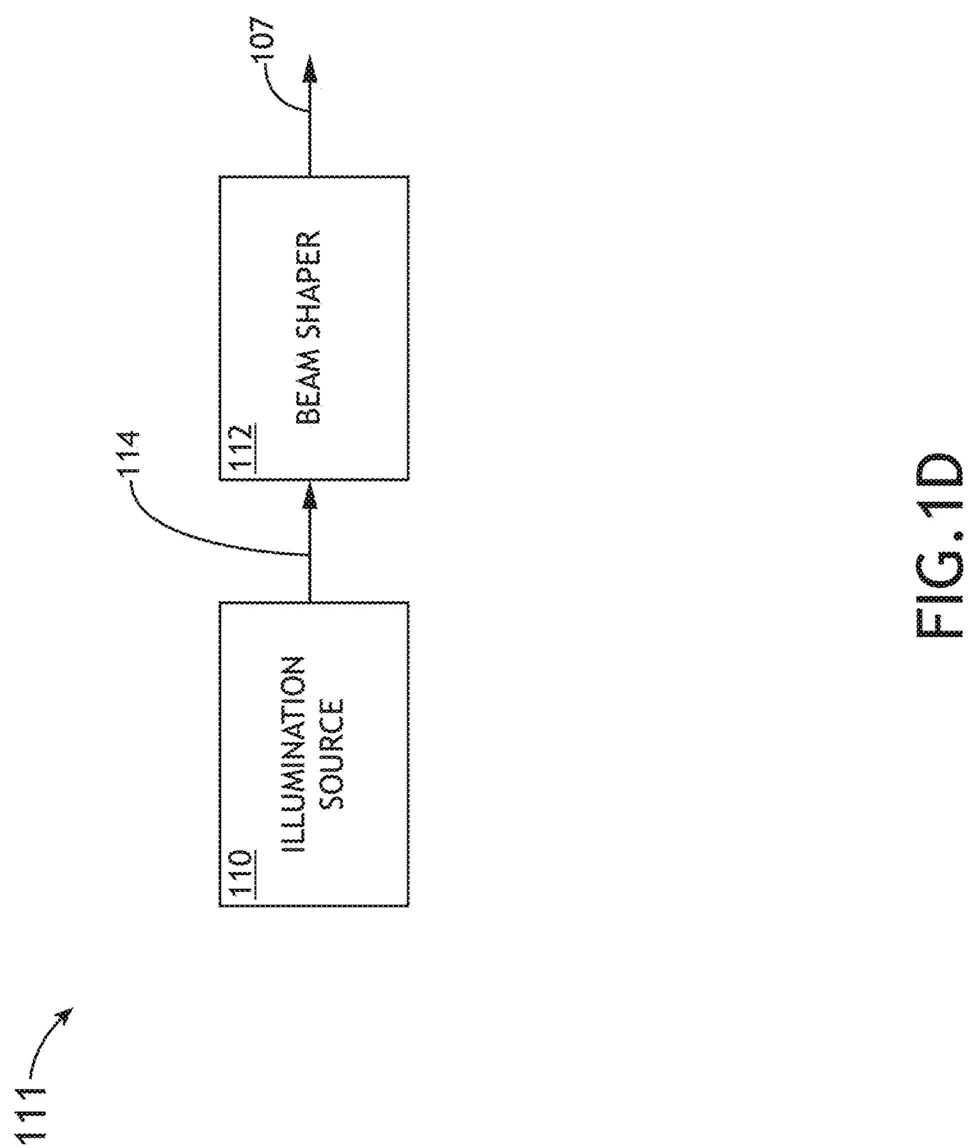
FIG. 1D is a block diagram of an illumination sub-system that generates pump illumination for a LSP illumination system, such as the system illustrated in FIG. 1A, 1B, 1C, or 1E, in accordance with one or more embodiments of the present disclosure.

In embodiments, the system 100 includes an illumination system 111 configured to generate pump illumination 107 of a selected wavelength, or wavelength range, such as, but not limited to, IR illumination or VIS illumination. As shown in FIG. 1D, the illumination system 111 includes an illumination source 110 (e.g., one or more lasers) and a beam shaper 112. In an embodiment, the illumination source 110 and the beam shaper 112 are distinct. For example, the beam shaper 112 can be optically coupled to but physically separate from the illumination source 110 (e.g., having its own separate housing). In another embodiment, the illumination source 110 and the beam shaper 112 may share a common housing. In another embodiment, the beam shaper 112 may be integrated within a structure of the illumination source 110. In another embodiment, the beam shaper 112 can include a system of optics configured to receive illumination 114 generated by the illumination source 110. In this regard, the beam shaper (or beam shaping system) 112 may be located at some distance from the illumination source 110. In some embodiments, the beam shaping system 112 includes a distributed set of optics.

In some embodiments, the illumination source 110 may be configured to generate source illumination 114 having a frequency (or frequency band) in the range of 3 terahertz (THz) to 3 petahertz (PHz) and a wavelength (or range of wavelengths) in the range of in the range of 100 nanometers (nm) to 100 micrometers (μm). For example, the illumination source 110 may be configured to emit source illumination 110 in the IR or VIS spectral ranges. In embodiments, the illumination source 110 is configured to generate illumination 114 having a pupil power distribution that is bell-shaped and/or gaussian/near-gaussian (e.g., as shown in FIG. 10). The pupil power distribution of the source illumination 114 can be characterized in that $$\frac{D_{20} - D_{80}}{D_{FWHM}} > 0.5,$$

where $D_{20}$ is a beam diameter at which an intensity of the pump illumination reaches 20%, $D_{80}$ is a beam diameter at which an intensity of the pump illumination reaches 80%, and $D_{FWHM}$ is a beam diameter at which an intensity of the pump illumination reaches 50%.

The beam shaper 112 is configured to receive the source illumination 114 output pump illumination 107 having different pupil power distribution than the pupil power distribution of the source illumination 114. For example, the illumination 114 generated by the illumination source 110 may be transmitted through a beam shaper (or beam shaping system) 112 configured to at least partially flatten, invert, and/or truncate the pupil power distribution of the illumination 114 in order to generate the pump illumination 107. In embodiments, the pupil power distribution of the pump illumination 107 can be characterized in that $$\frac{D_{20} - D_{80}}{D_{FWHM}} < 0.5,$$

where $D_{20}$ is a beam diameter at which an intensity of the pump illumination reaches 20%, $D_{80}$ is a beam diameter at which an intensity of the pump illumination reaches 80%, and $D_{FWHM}$ is a beam diameter at which an intensity of the pump illumination reaches 50%. In an embodiment, the beam shaper 112 is configured to convert the source illumination 114 into pump illumination 107 with a modified pupil power distribution that is flattened (e.g., flat-top or substantially flat-top) distribution, inverted distribution (e.g., where an edge region of the pupil power distribution has a greater intensity than a central region of the pupil power distribution), and/or truncated.

In an embodiment, the beam shaper (or beam shaping system) 112 includes a dedicated beam shaping tool or system, such as, but not limited to, the πSHAPER (piSHAPER) manufactured/distributed by AdlOptica Optical Systems GmbH, or the like. In another embodiment, the beam shaper (or beam shaping system) 112 can include one or more diffractive optical elements for beam-shaping, such as, but not limited to, the TOPHAT/STABLETOP BEAM-SHAPER or the M-SHAPER manufactured/distributed by HOLO/OR Ltd., the FBS TOP HAT BEAM SHAPER manufactured/distributed by TOPAG Lasertechnik GmbH, or the like. In another embodiment, the beam shaper (or beam shaping system) 112 can include one or more axicons.

Figure 12:
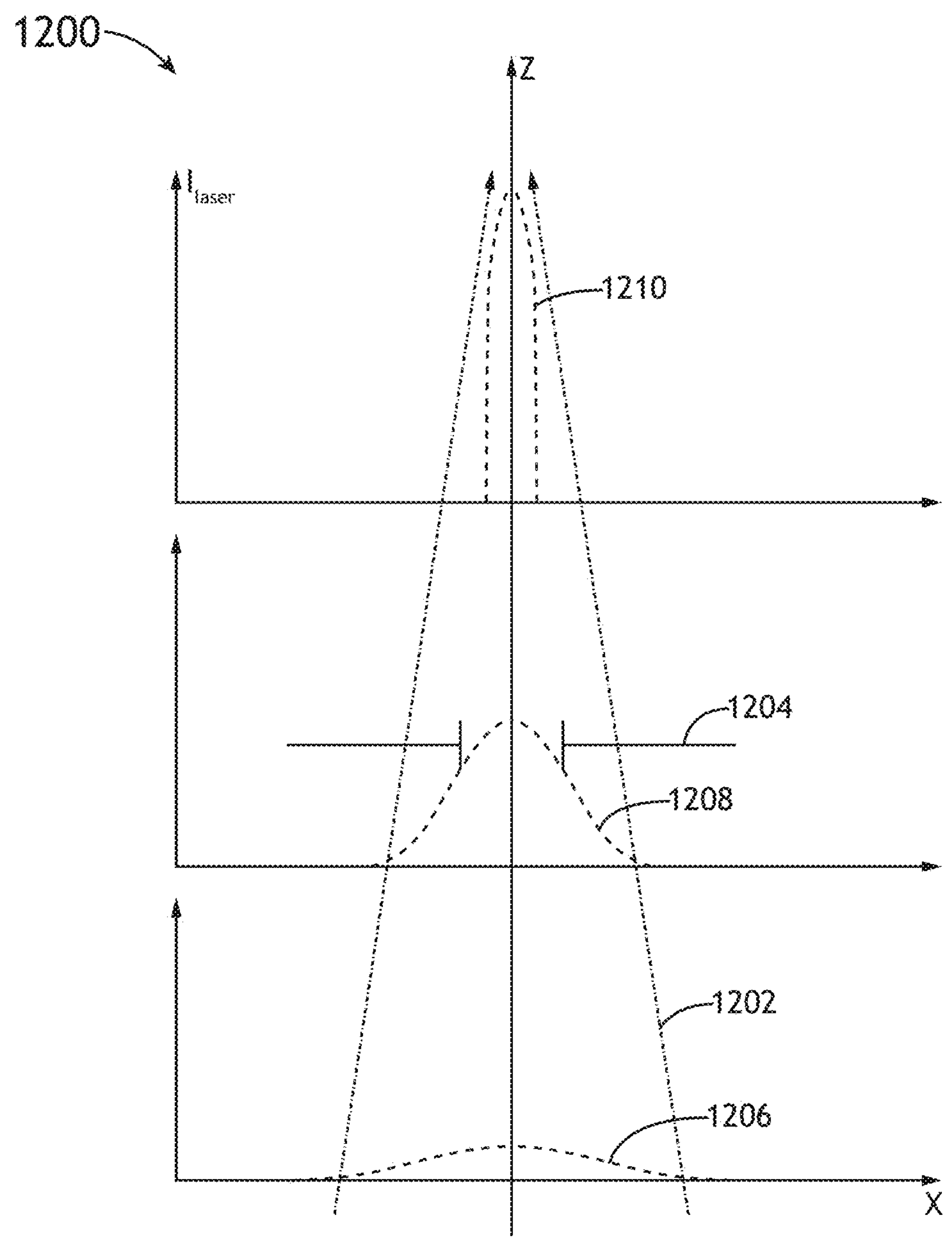
FIG. 12 shows a schematic illustration and graphical plots of pump illumination intensity distributions at different plasma regions for a LSP illumination system with a pump source that has a modified (e.g., truncated) pupil power distribution, in accordance with one or more embodiments of the present disclosure.

With reference to FIG. 12, in another embodiment, the beam shaper 112 comprises a limiting aperture 1204 that modifies the source illumination 1202 (e.g., illumination 114) by clipping the wings of the illumination 1202 so that the resulting pupil power distribution is a truncated version of the original pupil power distribution (e.g., distribution 1206, 1208) of the illumination 1202. For example, with reference to FIG. 1D, the pupil power distribution of the pump illumination 107 may be a truncated version of the pupil power distribution of the source illumination 114 when the beam shaper 112 comprises a limiting aperture, such as the limiting aperture 1204 illustrated in FIG. 12.

Figure 13:
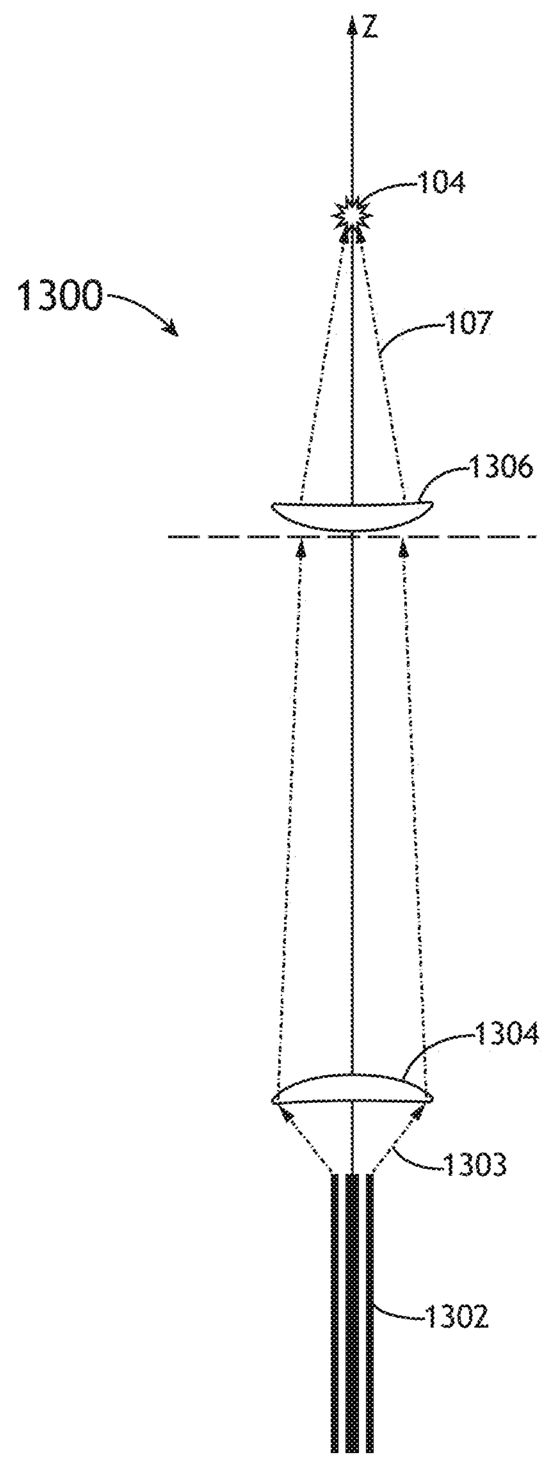
FIG. 13 is a schematic illustration of a delivery fiber imaged on a pupil plane of one or more focusing elements for a pump source that has a modified (e.g., flattened) pupil power distribution, in accordance with one or more embodiments of the present disclosure.

With reference to FIG. 13, in another embodiment, the beam shaper (or beam shaping system) 112 includes a system 1300 that selectively populates high-order transverse modes of a laser delivery fiber 1302 and/or utilizes the image of the fiber end as a pupil for focuses into LSP 104. The typical output 1303 of the laser delivery fiber 1302 is flat across the plane of the fiber 1302 and has a bell-shaped pupil distribution. In embodiments, one or more optical elements 1304 (e.g., lenses) are used to image the end of the laser deliver fiber 1302 onto the pupil plane of one or more focusing elements 1306 that focus the laser into the LSP 104 in order to provide a flattened pupil power distribution for the LSP pump illumination 107.

In general, the beam shaper (or beam shaping system) 112 can include any system of optics designed to convert source illumination 114 with a bell-shaped, gaussian/near-gaussian pupil power distribution into pump illumination 107 having an at least partially flattened, inverted, and/or truncated pupil power distribution. For example, the beam shaper (or beam shaping system) 112 can include any component or system of components described in *How to Design a Gaussian to Top-Hat Beam Shaper*, by Nam-Hyong Kim, updated by Alissa Wersal (ZEMAX Customer Portal, Aug. 13, 2015), published by ZEMAX LLC.

Figure 1E:
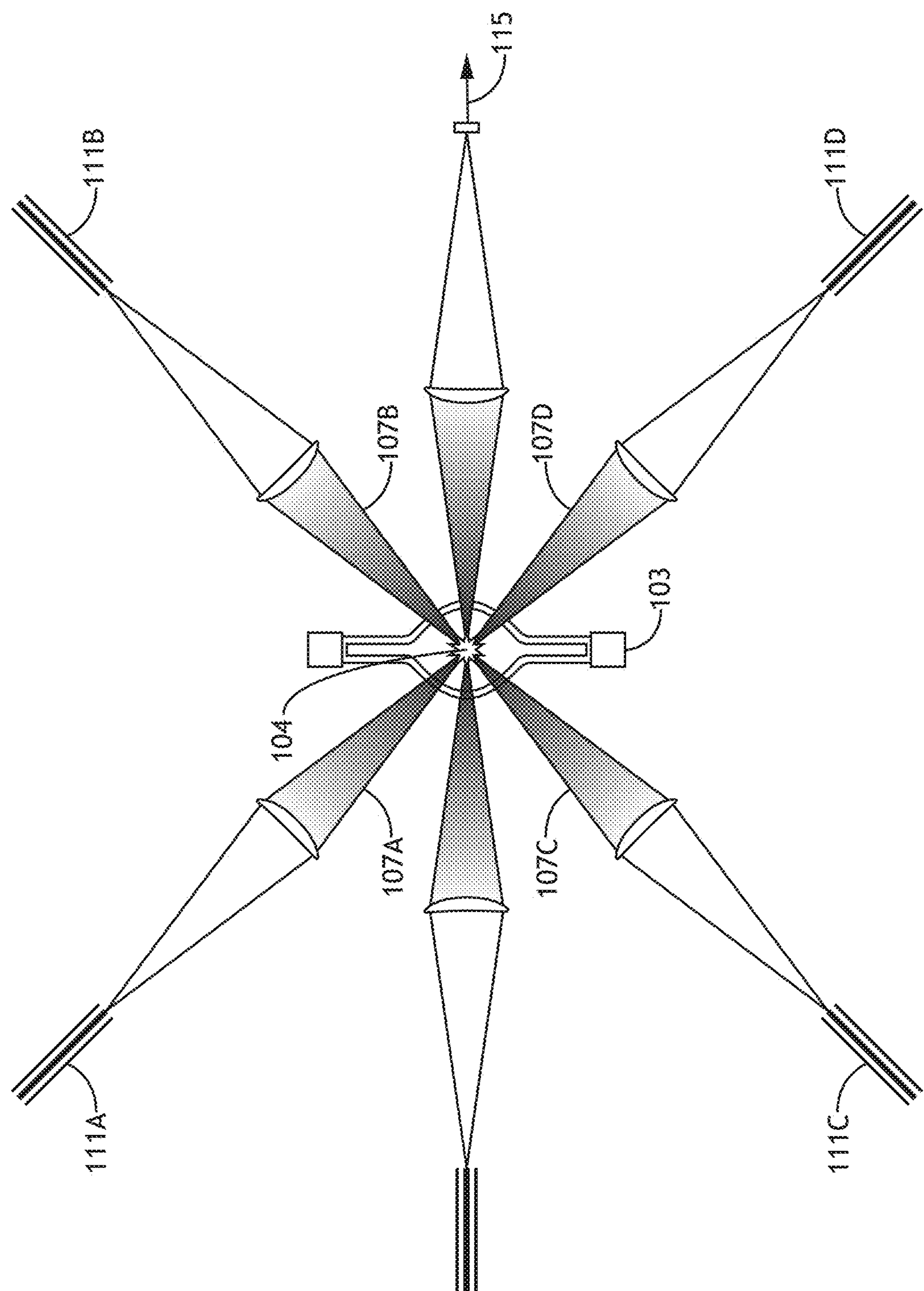
FIG. 1E is a schematic illustration of a laser sustained plasma (LSP) illumination system that can employ a plurality of pump sources that have modified pupil power distributions, in accordance with one or more embodiments of the present disclosure.

In embodiments, the illumination source 110 includes one or more lasers. In a general sense, the illumination source 110 may include any laser system known in the art. For instance, the illumination source 110 may include any laser system known in the art capable of emitting illumination in the infrared, visible or ultraviolet portions of the electromagnetic spectrum. In embodiments, the illumination source 110 may include a laser system configured to emit continuous wave (CW) illumination, configured to emit pulsed illumination, or configured to selectively emit CW or pulsed illumination (e.g., based upon a selected mode of the illumination source 110). For example, the illumination source 110 may include, but is not limited to, a Yb or Yt fiber laser, a Yb or Yt disk laser, Nd:YAG solid state laser, Nd:YLF laser, or the like. In other embodiments, the illumination source 110 may include one or more non-laser sources. For example, the illumination source 110 may include any non-laser illumination source known in the art, such as a non-laser system capable of emitting illumination discretely or continuously in the infrared, visible or ultraviolet portions of the electromagnetic spectrum. In some embodiments, as illustrated in FIG. 1E, the system 100 may include a plurality of pump modules (e.g., modules 111A, 111B, 111C, 111D) with respective illumination sources 110 configured to generate pump illumination (e.g., illumination 107A, 107B, 107C, 107D) that is directed at the plasma 104 or at plasma-forming material (to generate plasma 104).

It is contemplated that a plasma 104 (e.g., LSP) can be sustained by a train of such short pulses provided that the repetition rate of these pulses is higher than the inverse time of plasma decay. Typically, it takes about a microsecond to extinguish LSP. Thus, in some embodiments, the illumination source 110 is configured to emit pulsed illumination with a 1 megahertz (MHz) or higher repetition rate to ensure that the next pump pulse arrives to the plasma 104 before it has a chance to go off. In other embodiments, the repetition rate of the pulsed illumination source is at least 200 kilohertz. In some embodiments, the repetition rate of the pulsed illumination source is in the range of 1 megahertz to 1000 megahertz. In some embodiments, a pulse duration of the pulsed illumination source is in the range of 1 picosecond to 1000 picoseconds. In an embodiment, the illumination source 110 is a mode-locked Nd:YAG laser with about 100 MHz repetition rate and about 100 picosecond pulse. These examples are provided for illustrative purposes and are not intended as limitations of the present disclosure unless otherwise provided herein.

FIG. 1A shows an embodiment of a system 100 for generating and/or maintaining a plasma 104 (e.g., LSP) with pump illumination 107 generated by the illumination system 111. However, it is noted that the embodiment shown in FIG. 1A is one implementation, and the system 100 can also be implemented in accordance with any LSP light source configuration known in the art. For instance, FIGS. 1B, 1C, and 1E show additional examples of how the system 100 may be implemented. Furthermore, the illumination system 111 described herein can be implemented in any other LSP system architecture without departing from the scope of this disclosure.

In embodiments, the system 100 includes a plasma site 102 (e.g. for generating, or maintaining, a plasma 104). The plasma site 102 may include, but is not limited to, a plasma cell, plasma bulb, chamber, drum, or the like. The plasma site 102 can be configured to contain or support plasma forming material 103 (e.g., a gas or gas mixture and/or liquid or solid plasma forming material). Focusing pump illumination 107 from the illumination system 111 onto/into the plasma forming material 103 may cause energy to be absorbed through one or more selected absorption lines of the plasma forming material 103 or plasma 104 at the plasma site 102, thereby "pumping" the plasma forming material 103 in order to generate or sustain plasma 104. In some embodiments, although not shown, the plasma site 102 may include a set of electrodes for initiating the plasma 104 within the internal volume of the plasma site 102, whereby the pump illumination 107 from the illumination system 111 maintains the plasma 104 after ignition by the electrodes. The plasma 104 may emit broadband illumination, for example, upon relaxation of gas species to a lower energy level.

In some embodiments, excimers may form within the volume of gas outside of the generated plasma 104 at temperatures suitable for generating and/or maintaining a bound excimer state (e.g. a bound molecular state associated with one or more components of the plasma forming material 103) representing an excited energy state of the molecule. Excimers may emit illumination in the ultraviolet spectrum upon relaxation (e.g. de-excitation, or the like) to a lower energy state of the excimer. De-excitation of an excimer may result in a dissociation of the excimer molecule. For example, $Ar_2$* excimers may emit at 126 nm, $Kr_2$* excimers may emit at 146 nm, and $Xe_2$* excimers may emit at 172 nm or 175 nm. It is noted that the spectral content of illumination emanating from the plasma site 102 may include spectral components associated with emission from the plasma 104 and/or one or more excimers within the plasma site 102.

The system 100 may include a collector element 105 (e.g., an ellipsoidal or a spherical collector element) configured to focus illumination emanating from the illumination system 111 into a volume of a plasma forming material 103 contained within the plasma site 102. In embodiments, the collector element 105 is arranged to collect broadband illumination 115 emitted by plasma 104 and direct the broadband illumination 115 to one or more additional optical elements (e.g., filter 123, homogenizer 125, and the like). It is noted that the above configuration is not a limitation on the scope of the present disclosure. For example, the system 100 may include one or more reflector and/or focus optics for focusing and/or directing illumination from illumination system 111 into the volume of the plasma forming material 103 and a separate set of collection optics for collecting broadband illumination 115 emitted by the plasma 104. For example, an optical configuration including separate reflector optics and collection optics is described in U.S. Patent Publication No. 2016/0381776, published on Dec. 29, 2016, which is incorporated herein by reference in the entirety.

In some embodiments, the system 100 includes one or more propagation elements configured to direct and/or process illumination emitted from the plasma site 102. For example, the one or more propagation elements may include, but are not limited to, transmissive elements (e.g. transparent portions of the plasma site 102, one or more filters 123, and the like), reflective elements (e.g. the collector element 105, mirrors to direct the broadband illumination 115, and the like), or focusing elements (e.g. lenses, focusing mirrors, and the like).

It is noted herein that broadband emission 115 of plasma illumination is generally influenced by a multitude of factors including, but not limited to, the focused intensity of pump illumination 107 from the illumination system 111, the temperature of the plasma forming material 103, the pressure of the plasma forming material 103, and/or the composition of the plasma forming material 103. Further, spectral content of broadband illumination 115 emitted by the plasma 104 and/or the plasma forming material 103 (e.g. one or more excimers within the plasma site 102) may include, but is not limited to, infrared (IR), visible (VIS), ultraviolet (UV), vacuum ultraviolet (VUV), deep ultraviolet (DUV), or extreme ultraviolet (EUV) wavelengths. In an embodiment, the plasma 104 emits visible and IR illumination with wavelengths in at least the range of 600 to 1000 nm. In another embodiment, the plasma 104 emits visible and UV illumination with wavelengths in at least the range of 200 to 600 nm. In another embodiment, the plasma 104 emits at least short-wavelength illumination having a wavelength below 200 nm. In a further embodiment, one or more excimers in the plasma site 102 emit UV and/or VUV illumination. It is noted herein that the present disclosure is not limited to the wavelength ranges described above and the plasma 104 and/or excimers in the plasma site 102 may emit illumination having wavelengths in one or any combination of the ranges provided above.

It is contemplated herein that the system 100 may be utilized to initiate and/or sustain a plasma 104 using a variety of plasma forming materials 103. In an embodiment, the plasma forming material 103 used to initiate and/or maintain the plasma 104 may include a noble gas, an inert gas (e.g., noble gas or non-noble gas) and/or a non-inert gas (e.g., mercury). In another embodiment, the plasma forming material 103 includes a mixture of a gas (e.g., noble gas, non-noble gases and the like) and one or more gaseous trace materials (e.g., metal halides, transition metals and the like). For example, gases suitable for implementation in the present disclosure may include, but are not limited, to Xe, Ar, Ne, Kr, He, $N_2$, $H_2O$, $O_2$, $H_2$, $D_2$, $F_2$, $CH_4$, metal halides, halogens, Hg, Cd, Zn, Sn, Ga, Fe, Li, Na, K, TI, In, Dy, Ho, Tm, ArXe, ArHg, ArKr, ArRn, KrHg, XeHg, and the like. In a general sense, the present disclosure should be interpreted to extend to any LSP system and any type of gas mixture suitable for sustaining a plasma 104 at or within a plasma site 102.

The plasma site 102 may include any type of plasma site 102 known in the art suitable for initiating and/or maintaining a plasma 104. For example, in an embodiment, the plasma site 102 includes a plasma cell. The use of a plasma cell is described in at least U.S. Pat. No. 9,775,226, granted on Sep. 26, 2017; and U.S. Pat. No. 9,185,788, granted on Nov. 10, 2015, which are each incorporated herein by reference in the entirety. In another embodiment, the plasma site 102 includes a plasma bulb. The use of a plasma bulb is described in at least in U.S. Pat. No. 7,786,455, granted on Aug. 31, 2010; and U.S. Pat. No. 9,318,311, granted on Apr. 19, 2016, which are each incorporated herein by reference in the entirety.

It is noted herein that the various optical elements (e.g., illumination optics 119, 121; collection optics 105; and the like) may also be enclosed within the plasma site 102. In an embodiment, the plasma site 102 is a chamber suitable for containing a plasma forming material 103 and one or more optical components. For example, the use of a self-contained gas chamber is described in U.S. Pat. No. 9,099,292, granted on Aug. 4, 2015, which is incorporated herein by reference in the entirety.

In some embodiments, the plasma site 102 (e.g., plasma cell plasma bulb, chamber and the like) includes one or more transparent portions. The transparent portions can be formed from any material known in the art that is at least partially transparent to illumination generated by plasma 104. In an embodiment, the transparent portions may be formed from any material known in the art that is at least partially transparent to IR illumination, visible illumination and/or UV illumination 107 from the illumination system 111. In another embodiment, the transparent portions may be formed from any material known in the art that is at least partially transparent to the broadband illumination 115 emitted from the plasma 104. In an embodiment, a plasma site 102 contains a plasma forming material 103 including one or more gas components to suppress wavelengths of illumination corresponding to an absorption spectrum of any of the transparent portions of the plasma site 102. With regard to this embodiment, benefits of the inhibition of undesired wavelengths by the plasma forming material 103 may include, but are not limited to, reduced damage, reduced solarization, or reduced heating of the transparent portion of the plasma site 102.

In some embodiments, the transparent portions of the plasma site 102 may be formed from a low-OH content fused silica glass material. In other embodiments, the transparent portions of the plasma site 102 may be formed from high-OH content fused silica glass material. For example, the transparent portion of the plasma site 102 may include, but is not limited to, SUPRASIL 1, SUPRASIL 2, SUPRASIL 300, SUPRASIL 310, HERALUX PLUS, HERALUX-VUV, and the like. In other embodiments, the transparent portion of the plasma site 102 may include, but is not limited to, $CaF_2$, $MgF_2$, LiF, crystalline quartz and sapphire. It is noted herein that materials such as, but not limited to, $CaF_2$, $MgF_2$, crystalline quartz and sapphire provide transparency to short-wavelength illumination (e.g., $\lambda$<190 nm). Various glasses suitable for implementation in the transparent portion of the plasma site 102 (e.g., chamber window, glass bulb, glass tube or transmission element) of the present disclosure are discussed in detail in A. Schreiber et al., Illumination Resistance of Quartz Glass for VUV Discharge Lamps, J. Phys. D: Appl. Phys. 38 (2005), 3242-3250, which is incorporated herein by reference in the entirety. It is noted herein that fused silica does provide some transparency to illumination having wavelength shorter than 190 nm, showing useful transparency to wavelengths as short as 170 nm.

The one or more transparent portions of the plasma site 102 may take on any shape known in the art. In an embodiment, the transparent may have a cylindrical shape. In another embodiment, the transparent portion may have a spherical shape. In another embodiment, the transparent portion may have a composite shape. For example, the shape of the transparent portion may consist of a combination of two or more shapes.

The collector element 105 may take on any physical configuration known in the art suitable for focusing illumination emanating from the illumination system 111 into or onto the plasma forming material 103. In an embodiment (e.g., as shown in FIG. 1A), the collector element 105 may include a concave region with a reflective internal surface suitable for receiving illumination 107 from the illumination system 111 and focusing the illumination 107 into the volume of plasma forming material 103 contained within the plasma site 102. For example, the collector element 105 may include an ellipsoid-shaped collector element 105 having a reflective internal surface, as shown in FIG. 1A. As another example, the collector element 105 may include a spherical-shaped collector element 105 having a reflective internal surface.

In some embodiments, the collector element 105 collects broadband illumination 115 emitted by plasma 104 and directs the broadband illumination 115 to one or more downstream optical elements. For example, the one or more downstream optical elements may include, but are not limited to, a homogenizer 125, one or more focusing elements, a filter 123, a stirring mirror and the like. In some embodiments, the collector element 105 may collect broadband illumination 115 including EUV, DUV, VUV, UV, visible and/or infrared illumination emitted by plasma 104 and direct the broadband illumination to one or more downstream optical elements. In this regard, the plasma site 102 may deliver EUV, DUV, VUV, UV, visible, and/or infrared illumination to downstream optical elements of any optical characterization system known in the art, such as, but not limited to, an inspection tool or a metrology tool. For example, the LSP system 100 may serve as an illumination sub-system, or illuminator, for a broadband inspection tool (e.g., wafer or reticle inspection tool), a metrology tool or a photolithography tool. It is noted herein the plasma site 102 of system 100 may emit useful illumination in a variety of spectral ranges including, but not limited to, EUV, DUV illumination, VUV illumination, UV illumination, visible illumination, and infrared illumination.

In some embodiments, the system 100 may include various additional optical elements. For example, additional optics may include collection optics configured to collect broadband illumination emanating from the plasma 104. For instance, the system 100 may include a cold mirror 121 (e.g. operating as a beam splitter, a sampler, or the like) arranged to direct illumination from the collector element 105 to downstream optics, such as, but not limited to, a homogenizer 125.

In some embodiments, the system 100 may include one or more additional lenses placed along either the illumination pathway or the collection pathway of system 100. The one or more lenses may be utilized to focus illumination from the illumination system 111 into the volume of plasma forming material 103. Alternatively, the one or more additional lenses may be utilized to focus broadband illumination emitted by the plasma 104 onto a selected target (not shown).

In some embodiments, the system 100 may include a turning mirror 119. The turning mirror 119 may be arranged to receive illumination 107 from the illumination system 111 and direct the illumination 107 to the plasma forming material 103 via collection element 105. The collection element 105 may be arranged to receive illumination 107 from mirror 119 and focus the illumination 107 to the focal point of the collection element 105 (e.g., ellipsoid-shaped collection element), where the plasma forming material 103 or plasma 104 is located.

It is noted herein that the set of optics of system 100 as described above and illustrated in FIGS. 1A through 1D are provided for illustration and should not be interpreted as limiting. It is contemplated that a number of equivalent optical configurations may be utilized within the scope of the present disclosure.

Figure 14:
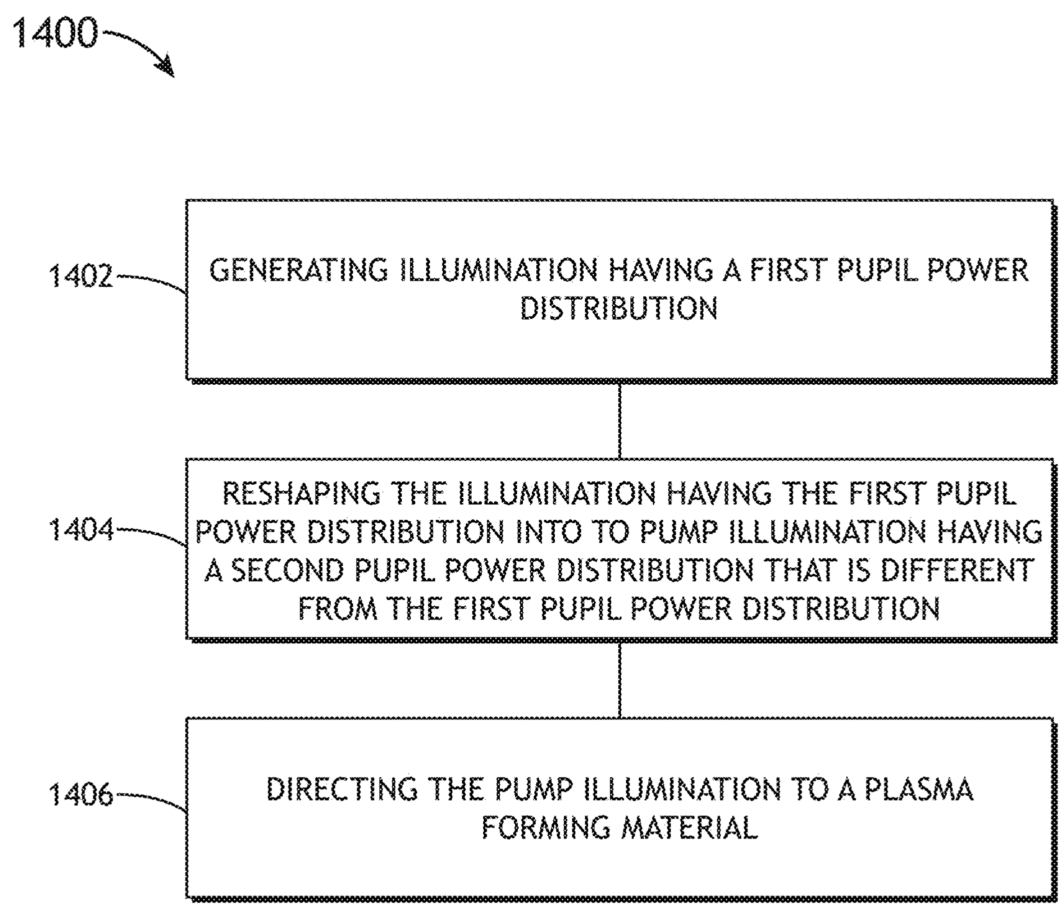
FIG. 14 is a flow diagram illustrating method for generating broadband illumination by pumping LSP with a pump source that has a modified pupil power distribution, in accordance with one or more implementations.

FIG. 14 is a flow diagram illustrating one or more implementations of a method 1400 for generating broadband illumination by pumping LSP with a pump source that has a modified pupil power distribution. It is noted that the embodiments and enabling technologies described previously herein in the context of system 100 should be interpreted to extend to method 1400. In this regard, the steps of method 1400 may be carried out by system 100, and the method 1400 may further include one or more steps required or implied by the architecture of system 100. However, the method 1400 is not limited to the architecture of system 100, and it is recognized that one or more steps of method 1400, or portions thereof, may be carried out with alternative system components and/or architecture.

At step 1402, illumination 114 having a first pupil power distribution is generated. For example, the illumination source 110 can be configured to generate illumination 114 having a bell-shaped, gaussian, or near-gaussian pupil power distribution, or the like. In implementations, the first pupil power distribution can be characterized in that $$\frac{D_{20}-D_{80}}{D_{FWHM}} > 0.5,$$

where $D_{20}$ is a beam diameter at which an intensity of the pump illumination reaches 20%, $D_{80}$ is a beam diameter at which an intensity of the pump illumination reaches 80%, and $D_{FWHM}$ is a beam diameter at which an intensity of the pump illumination reaches 50%.

At step 1404, the illumination having the first pupil power distribution is reshaped into pump illumination 107 that has a second (modified) pupil power distribution that is different from the first pupil power distribution. For example, the illumination 114 generated by the illumination source 110 may be transmitted through a beam shaper (or beam shaping system) 112 configured to at least partially flatten, invert, and/or truncate the pupil power distribution of the illumination 114 in order to generate the pump illumination 107. In implementations, the pupil power distribution of the pump illumination 107 (i.e., the second pupil power distribution) can be characterized in that $$\frac{D_{20}-D_{80}}{D_{FWHM}} < 0.5,$$

where $D_{20}$ is a beam diameter at which an intensity of the pump illumination reaches 20%, $D_{80}$ is a beam diameter at which an intensity of the pump illumination reaches 80%, and $D_{FWHM}$ is a beam diameter at which an intensity of the pump illumination reaches 50%.

At step 1406, the pump illumination 107 is directed to a plasma site 102 or a plasma forming material 103. For example, illumination optics 119, 121 and/or collection optics 105 can be configured to direct the pump illumination 107 from the illumination system 111 to the plasma site 102. In some embodiments, the pump illumination 107 causes the plasma forming material 103 to form a plasma 104 that emits broadband illumination. In other embodiments, the pump illumination 107 pumps (i.e., sustains) the plasma 104 after the plasma 104 is already present in the system 100.

Figure 15:
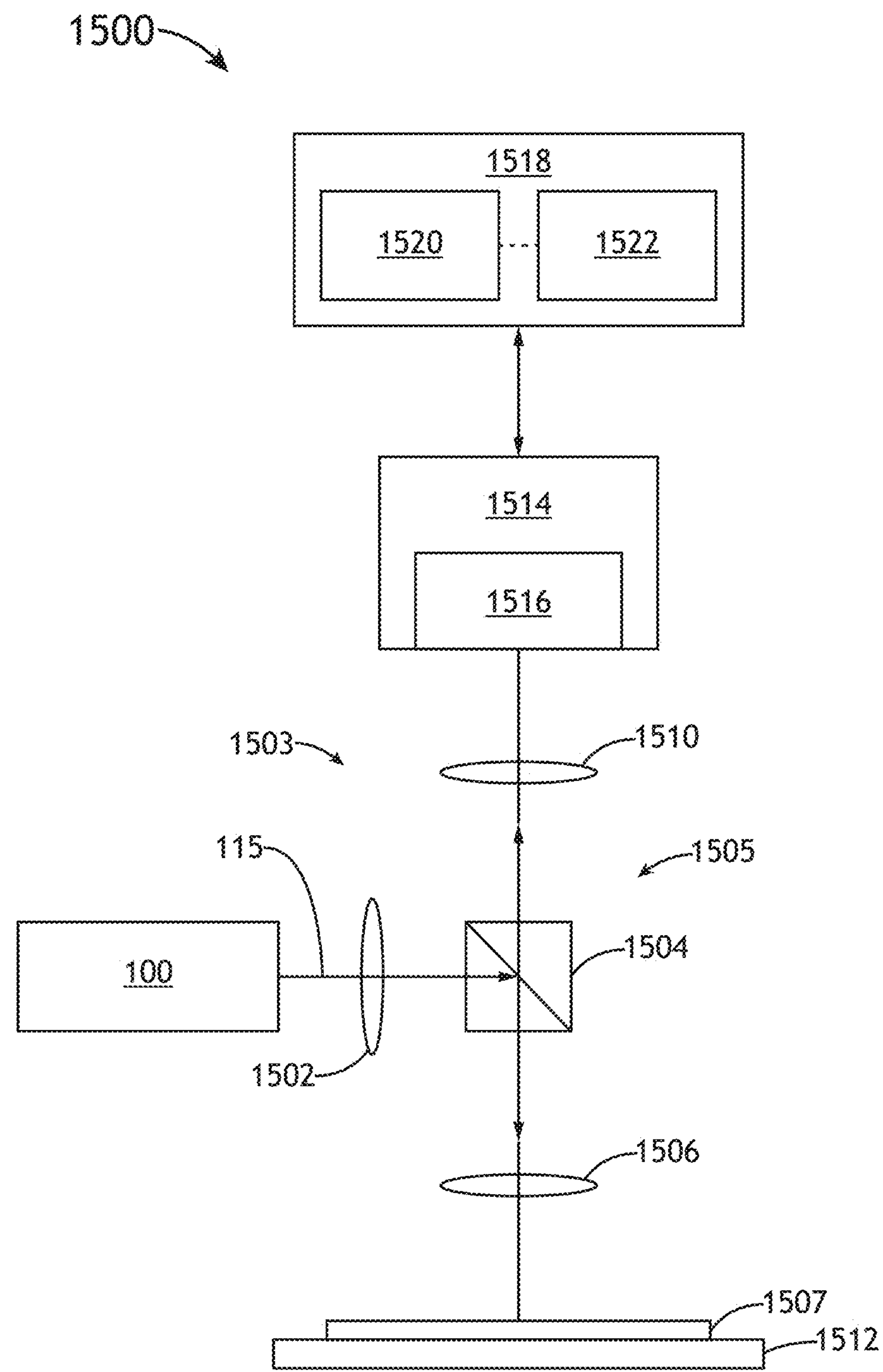
FIG. 15 is schematic illustration of an optical characterization system implementing a LSP illumination source, such as the system illustrated in FIG. 1A, 1B, or 1C, in accordance with one or more embodiments of the present disclosure.

FIG. 15 illustrates a simplified schematic view of an optical characterization system 1500 implementing the LSP illumination system 100, in accordance with one or more embodiments of the present disclosure. In one embodiment, system 1500 includes the LSP illumination system 100, an illumination arm 1503, a collection arm 1505, a detector assembly 1514, and a controller 1518 including one or more processors 1520 and memory 1522.

It is noted herein that system 1500 may comprise any imaging, inspection, metrology, lithography, or other characterization system known in the art. In this regard, system 1500 may be configured to perform inspection, optical metrology, lithography, and/or any form of imaging on a specimen 1507. Specimen 1507 may include any sample known in the art including, but not limited to, a wafer, a reticle/photomask, and the like. It is noted that system 1500 may incorporate one or more of the various embodiments of the LSP illumination system 100 described throughout the present disclosure.

In one embodiment, specimen 1507 is disposed on a stage assembly 1512 to facilitate movement of specimen 1507. Stage assembly 1512 may include any stage assembly 1512 known in the art including, but not limited to, an X-Y stage, an R-θ stage, and the like. In another embodiment, stage assembly 1512 is capable of adjusting the height of specimen 1507 during inspection or imaging to maintain focus on the specimen 1507.

In another embodiment, the illumination arm 1503 is configured to direct illumination 115 from the LSP illumination system 100 to the specimen 1507. The illumination arm 1503 may include any number and type of optical components known in the art. In one embodiment, the illumination arm 1503 includes one or more optical elements 1502, a beam splitter 1504, and an objective lens 1506. In this regard, illumination arm 1503 may be configured to focus illumination 115 from the LSP illumination system 100 onto the surface of the specimen 1507. The one or more optical elements 1502 may include any optical element or combination of optical elements known in the art including, but not limited to, one or more mirrors, one or more lenses, one or more polarizers, one or more gratings, one or more filters, one or more beam splitters, and the like.

In another embodiment, the collection arm 1505 is configured to collect light reflected, scattered, diffracted, and/or emitted from specimen 1507. In another embodiment, collection arm 1505 may direct and/or focus the light from the specimen 1507 to a sensor 1516 of a detector assembly 1514. It is noted that sensor 1516 and detector assembly 1514 may include any sensor and detector assembly known in the art. The sensor 1516 may include, but is not limited to, a charge-coupled device (CCD) detector, a complementary metal-oxide semiconductor (CMOS) detector, a time-delay integration (TDI) detector, a photomultiplier tube (PMT), an avalanche photodiode (APD), and the like. Further, sensor 1516 may include, but is not limited to, a line sensor or an electron-bombarded line sensor.

In another embodiment, detector assembly 1514 is communicatively coupled to a controller 1518 including one or more processors 1520 and memory 1522. For example, the one or more processors 1520 may be communicatively coupled to memory 1522, wherein the one or more processors 1520 are configured to execute a set of program instructions stored on memory 1522. In one embodiment, the one or more processors 1520 are configured to analyze the output of detector assembly 1514. In one embodiment, the set of program instructions are configured to cause the one or more processors 1520 to analyze one or more characteristics of specimen 1507. In another embodiment, the set of program instructions are configured to cause the one or more processors 1520 to modify one or more characteristics of system 1500 in order to maintain focus on the specimen 1507 and/or the sensor 1516. For example, the one or more processors 1520 may be configured to adjust the objective lens 1506 or one or more optical elements 1502 in order to focus illumination 115 from LSP illumination system 100 onto the surface of the specimen 1507. By way of another example, the one or more processors 1520 may be configured to adjust the objective lens 1506 and/or one or more optical elements 1510 in order to collect illumination from the surface of the specimen 1507 and focus the collected illumination on the sensor 1516.

It is noted that the system 1500 may be configured in any optical configuration known in the art including, but not limited to, a dark-field configuration, a bright-field orientation, and the like.

It is noted herein that the one or more components of system 100 may be communicatively coupled to the various other components of system 100 in any manner known in the art. For example, the LSP illumination system 100, detector assembly 1514, controller 1518, and one or more processors 1520 may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

Figure 16:
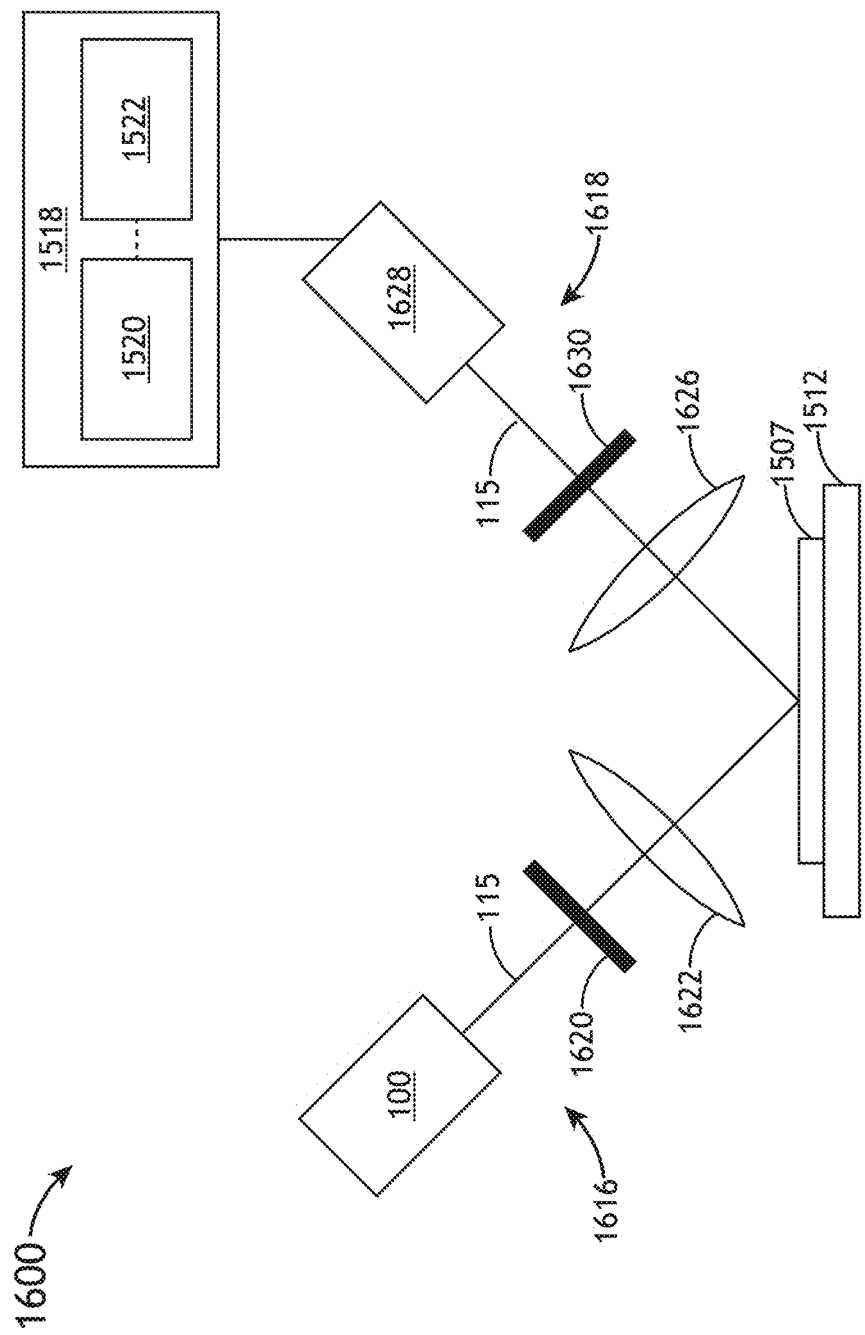
FIG. 16 is a schematic illustration of an optical characterization system implementing a LSP illumination source, such as the system illustrated in FIG. 1A, 1B, or 1C, in accordance with one or more embodiments of the present disclosure.

FIG. 16 illustrates a simplified schematic diagram of an optical characterization system 1600 arranged in a reflectometry and/or ellipsometry configuration, in accordance with one or more embodiments of the present disclosure. It is noted that the various embodiments and components described with respect to FIG. 15 may be interpreted to extend to the system of FIG. 16. The system 1600 may include any type of metrology system known in the art.

In one embodiment, system 1600 includes the LSP illumination system 100, an illumination arm 1616, a collection arm 1618, a detector assembly 1628, and the controller 1518 including the one or more processors 1520 and memory 1522.

In this embodiment, the broadband illumination 115 from the LSP illumination source is directed to the specimen 1507 via the illumination arm 1616. In another embodiment, the system 1600 collects illumination emanating from the sample via the collection arm 1618. The illumination arm pathway 1616 may include one or more beam conditioning components 1620 suitable for modifying and/or conditioning the broadband beam 115. For example, the one or more beam conditioning components 1620 may include, but are not limited to, one or more polarizers, one or more filters, one or more beam splitters, one or more diffusers, one or more homogenizers, one or more apodizers, one or more beam shapers, or one or more lenses.

In another embodiment, the illumination arm 1616 may utilize a first focusing element 1622 to focus and/or direct the beam 115 onto the specimen 1507 disposed on the sample stage 1512. In another embodiment, the collection arm 1618 may include a second focusing element 1626 to collect illumination from the specimen 1507.

In another embodiment, the detector assembly 1628 is configured to capture illumination emanating from the specimen 1507 through the collection arm 1618. For example, the detector assembly 1628 may receive illumination reflected or scattered (e.g., via specular reflection, diffuse reflection, and the like) from the specimen 1507. By way of another example, the detector assembly 1628 may receive illumination generated by the specimen 1507 (e.g., luminescence associated with absorption of the beam 115, and the like). It is noted that detector assembly 1628 may include any sensor and detector assembly known in the art. The sensor may include, but is not limited to, CCD detector, a CMOS detector, a TDI detector, a PMT, an APD, and the like.

The collection arm 1618 may further include any number of collection beam conditioning elements 1630 to direct and/or modify illumination collected by the second focusing element 1626 including, but not limited to, one or more lenses, one or more filters, one or more polarizers, or one or more phase plates.

The system 1600 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

A description of an inspection/metrology tools suitable for implementation in the various embodiments of the present disclosure are provided in U.S. patent application Ser. No. 13/544,954, entitled “Wafer Inspection,” filed on Jul. 9, 2012; U.S. Published Patent Application 2009/0180176, entitled “Split Field Inspection System Using Small Catadioptric Objectives,” published on Jul. 16, 2009; U.S. Published Patent Application 2007/0002465, entitled “Beam Delivery System for Laser Dark-Field Illumination in a Catadioptric Optical System,” published on Jan. 4, 2007; U.S. Pat. No. 5,999,310, entitled “Ultra-broadband UV Microscope Imaging System with Wide Range Zoom Capability,” issued on Dec. 7, 1999; U.S. Pat. No. 7,525,649 entitled “Surface Inspection System Using Laser Line Illumination with Two Dimensional Imaging,” issued on Apr. 28, 2009; U.S. Published Patent Application 2013/0114085, entitled “Dynamically Adjustable Semiconductor Metrology System,” by Wang et al. and published on May 9, 2013; U.S. Pat. No. 5,608,526, entitled “Focused Beam Spectroscopic Ellipsometry Method and System, by Piwonka-Corle et al., issued on Mar. 4, 1997; and U.S. Pat. No. 6,297,880, entitled “Apparatus for Analyzing Multi-Layer Thin Film Stacks on Semiconductors,” by Rosencwaig et al., issued on Oct. 2, 2001, which are each incorporated herein by reference in their entirety.

The one or more processors 1520 of the present disclosure may include any one or more processing elements known in the art. In this sense, the one or more processors 1520 may include any microprocessor-type device configured to execute software algorithms and/or instructions. It should be recognized that the steps described throughout the present disclosure may be carried out by a single computer system or, alternatively, multiple computer systems. In general, the term “processor” may be broadly defined to encompass any device having one or more processing and/or logic elements, which execute program instructions from a non-transitory memory medium 1522. Moreover, different subsystems of the various systems disclosed may include processor and/or logic elements suitable for carrying out at least a portion of the steps described throughout the present disclosure.

The memory medium 1522 may include any storage medium known in the art suitable for storing program instructions executable by the associated one or more processors 1520. For example, the memory medium 1522 may include a non-transitory memory medium. For instance, the memory medium 1522 may include, but is not limited to, a read-only memory, a random-access memory, a magnetic or optical memory device (e.g., disk), a magnetic tape, a solid-state drive, and the like. In another embodiment, the memory 1522 is configured to store one or more results and/or outputs of the various steps described herein. It is further noted that memory 1522 may be housed in a common controller housing with the one or more processors 1520. In an alternative embodiment, the memory 1522 may be located remotely with respect to the physical location of the one or more processors 1520. For instance, the one or more processors 1520 may access a remote memory (e.g., server), accessible through a network (e.g., internet, intranet, and the like). In this regard, the one or more processors 1520 of the controller 1518 may execute any of the various process steps described throughout the present disclosure.

In some embodiments, the LSP illumination system 100 and systems 1500, 1600, as described herein, may be configured as a "stand alone tool," interpreted herein as a tool that is not physically coupled to a process tool. In other embodiments, such an inspection or metrology system may be coupled to a process tool (not shown) by a transmission medium, which may include wired and/or wireless portions. The process tool may include any process tool known in the art such as a lithography tool, an etch tool, a deposition tool, a polishing tool, a plating tool, a cleaning tool, or an ion implantation tool. The results of inspection or measurement performed by the systems described herein may be used to alter a parameter of a process or a process tool using a feedback control technique, a feedforward control technique, and/or an in-situ control technique. The parameter of the process or the process tool may be altered manually or automatically.

The embodiments of the LSP illumination system 100 and systems 1500, 1600 may be further configured as described herein. In addition, the LSP illumination system 100 and systems 1500, 1600 may be configured to perform any other step(s) of any of the method implementation(s) (e.g., method 1400) described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for generating pump illumination for a laser sustained plasma, comprising:

an illumination source configured to output illumination having a first beam profile with a central peak and decreasing intensity along a transverse direction perpendicular to a propagation direction;

a focusing lens; and a beam shaper configured to receive the illumination having the first beam profile from the illumination source and configured to output pump illumination having a second beam profile that is different from the first beam profile, wherein the second beam profile is selected to provide a distribution of the output pump illumination through a focal region around a focal plane when focused with the focusing lens, wherein the distribution of the output pump illumination maintains a plasma in at least a portion of the focal region around the focal plane when focused with the focusing lens, wherein the plasma emits broadband light, wherein the second beam profile and a power of the output pump illumination are selected to increase at least one of a radiance or a temperature of the plasma relative to a plasma generated with the first beam profile by decreasing a peak intensity of the output pump illumination in locations prior to the focal plane in order to decrease a length of the plasma along the propagation direction in the locations prior to the focal plane, decrease associated absorption of the output pump illumination by the plasma in the locations prior to the focal plane, and increase absorption of the output pump illumination by the plasma in locations proximate to the focal plane relative to the plasma generated with the first beam profile.

2. The system of claim 1, wherein the first beam profile comprises at least one of a bell-shaped distribution, a gaussian distribution, or a near-gaussian distribution.

3. The system of claim 1, wherein the second beam profile comprises an inverted profile with a center-to-edge intensity ratio of less than one.

4. The system of claim 1, wherein the second beam profile comprises a truncated version of the first pupil power distribution.

5. The system of claim 1, wherein the beam shaper comprises one or more diffractive optical elements.

6. The system of claim 1, wherein the beam shaper comprises one or more axicons.

7. The system of claim 1, wherein the beam shaper comprises a delivery fiber imaged on a pupil plane of one or more focusing elements.

8. The system of claim 1, wherein the beam shaper comprises a delivery fiber with selectively populated high-order transverse modes.

9. The system of claim 1, wherein the beam shaper comprises a limiting aperture.

10. The system of claim 1, wherein the beam shaper is configured to output the pump illumination from the illumination source onto a pupil plane such that the pump illumination having the second pupil power distribution uniformly fills an available solid angle of the illumination beam.

11. The system of claim 1, wherein the second beam profile comprises:

a flat-top profile.

12. A system for generating broadband illumination, comprising:

a plasma forming material;

one or more pump modules, each pump module including:

an illumination source configured to output illumination having a first beam profile with a central peak and decreasing intensity along a transverse direction perpendicular to a propagation direction;

a focusing lens; and a beam shaper configured to receive the illumination having the first beam profile from the illumination source and configured to output pump illumination having a second beam profile that is different from the first beam profile, wherein the second beam profile is selected to provide a distribution of the output pump illumination through a focal region around a focal plane when focused with the focusing lens, wherein the distribution of the output pump illumination maintains a plasma in at least a portion of the focal region around the focal plane when focused with the focusing lens, wherein the plasma emits broadband light, wherein the second beam profile and a power of the output pump illumination are selected to increase at least one of a radiance or a temperature of the plasma relative to a plasma generated with the first beam profile by decreasing a peak intensity of the output pump illumination in locations prior to the focal plane to decrease a length of the plasma along the propagation direction in the locations prior to the focal plane, decrease associated absorption of the output pump illumination by the plasma in the locations prior to the focal plane, and increase absorption of the output pump illumination by the plasma in locations proximate to the focal plane relative to the plasma generated with the first beam profile.

13. The system of claim 12, wherein the first beam profile comprises at least one of a bell-shaped distribution, a gaussian distribution, or a near-gaussian distribution.

14. The system of claim 12, wherein the second beam profile comprises an inverted profile with a center-to-edge intensity ratio of less than one.

15. The system of claim 12, wherein the second beam profile comprises a truncated version of the first pupil power distribution.

16. The system of claim 12, wherein the beam shaper comprises one or more diffractive optical elements.

17. The system of claim 12, wherein the beam shaper comprises one or more axicons.

18. The system of claim 12, wherein the beam shaper comprises a delivery fiber imaged on a pupil plane of one or more focusing elements.

19. The system of claim 12, wherein the beam shaper comprises a delivery fiber with selectively populated high-order transverse modes.

20. The system of claim 12, wherein the beam shaper comprises a limiting aperture.

21. The system of claim 12, wherein the beam shaper is configured to output the pump illumination from the illumination source onto a pupil plane such that the pump illumination having the second pupil power distribution uniformly fills an available solid angle.

22. The system of claim 12, wherein the second beam profile comprises:

a flat-top profile.

23. A method of generating broadband illumination, comprising:

generating illumination having a first beam profile with an illumination source, wherein the first beam profile includes a central peak and decreasing intensity along a transverse direction perpendicular to a propagation direction;

reshaping the illumination having the first beam profile into pump illumination having a second beam profile that is different from the first beam profile; and directing the pump illumination to a plasma forming material, wherein the second beam profile is selected to provide a distribution of the output pump illumination through a focal region around a focal plane when focused with a focusing lens, wherein the distribution maintains a plasma in at least a portion of the focal region around the focal plane when focused with the focusing lens, wherein the plasma emits broadband light, wherein the second beam profile and a power of the output pump illumination are selected to increase at least one of a radiance or a temperature of the plasma relative to a plasma generated with the first beam profile by decreasing a peak intensity of the output pump illumination in the locations prior to focal plane to decrease a length of the plasma along the propagation direction in the locations prior to the focal plane, decrease associated absorption of the output pump illumination by the plasma in the locations prior to the focal plane, and increase absorption of the output pump illumination by the plasma in locations proximate to the focal plane relative to the plasma generated with the first beam profile.

24. The method of claim 23, wherein the first beam profile comprises at least one of a bell-shaped distribution, a gaussian distribution, or a near-gaussian distribution, wherein the second beam profile comprises at least one of a flat-top distribution, an inverted distribution with a center-to-edge ratio of less than one, or a truncated version of the first beam profile.

25. The method of claim 23, wherein the illumination source is one of multiple illumination sources configured to pump the plasma forming material.

26. The method of claim 23, wherein the beam shaper is configured to output the pump illumination from the illumination source onto a pupil plane such that the pump illumination having the second pupil power distribution uniformly fills an available solid angle.

27. A system for generating pump illumination for a laser sustained plasma, comprising:

an illumination source configured to output illumination having a first beam profile with a central peak and decreasing intensity along a transverse direction perpendicular to a propagation direction;

a focusing lens; and a beam shaper configured to receive the illumination having the first beam profile from the illumination source and configured to output pump illumination having a second beam profile that is different from the first beam profile, wherein the second beam profile is an inverted profile having a center-to-edge ratio of less than one, is selected to provide a distribution of the output pump illumination through a focal region around the focal plane when focused with the focusing lens, wherein the through-focus distribution maintains a plasma in at least a portion of the focal region around the focal plane when focused with the focusing lens, wherein the plasma emits broadband light, wherein the second beam profile and a power of the output pump illumination are selected to increase at least one of a radiance or a temperature of the plasma relative to a plasma generated with the first beam profile by decreasing a peak intensity of the output pump illumination in locations prior to the focal plane in order to decrease a length of the plasma along the propagation direction in the locations prior to the focal plane, decrease associated absorption of the output pump illumination by the plasma in the locations prior to the focal plane, and increase absorption of the output pump illumination by the plasma in locations proximate to the focal plane relative to the plasma generated with the first beam profile.

* * * * *